Sept. 20, 1949.　　　　R. R. STEVENS ET AL　　　　2,482,300
CONTROL APPARATUS
Filed July 14, 1943　　　　　　　　　　　　　　6 Sheets-Sheet 2
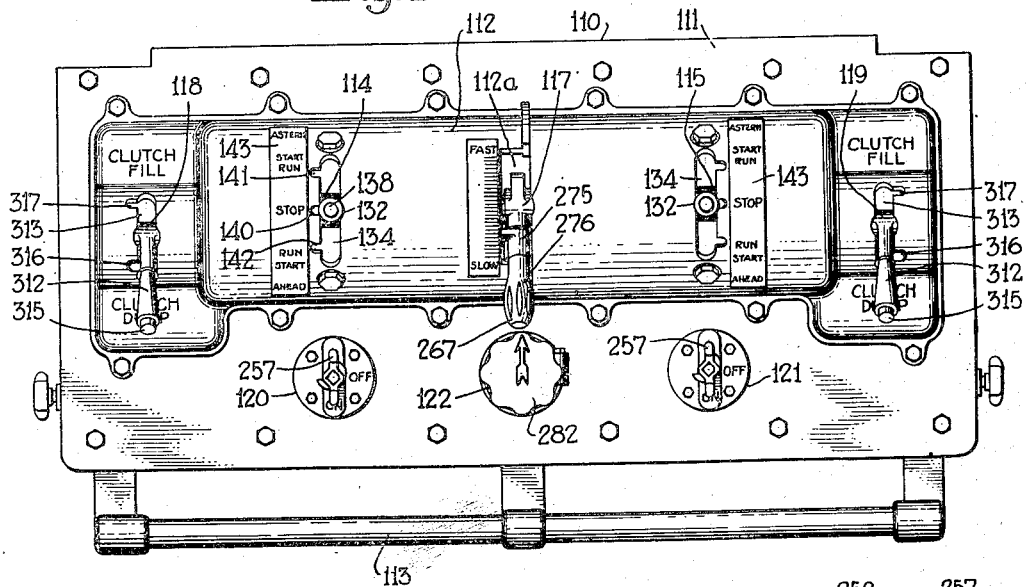
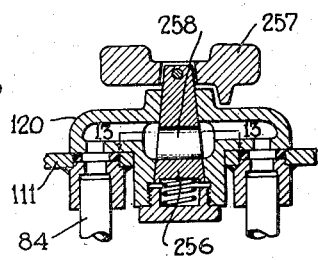
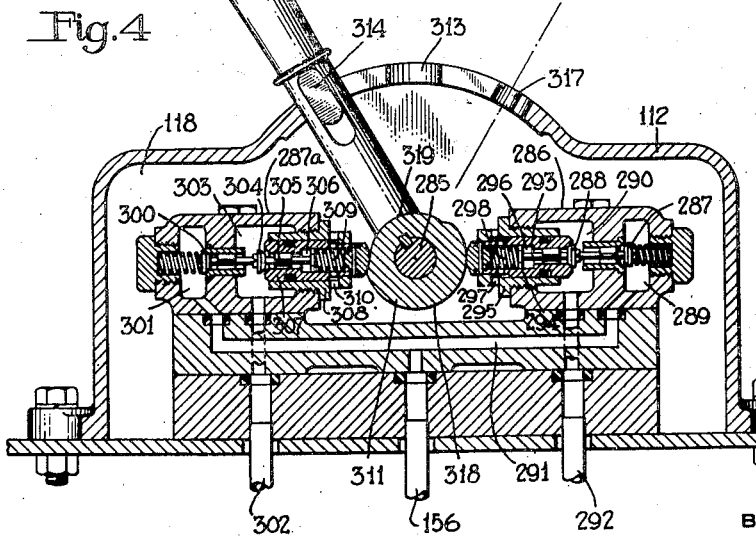
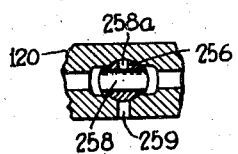
INVENTORS
Ray R. Stevens
Arthur G. Larson
BY
ATTORNEY

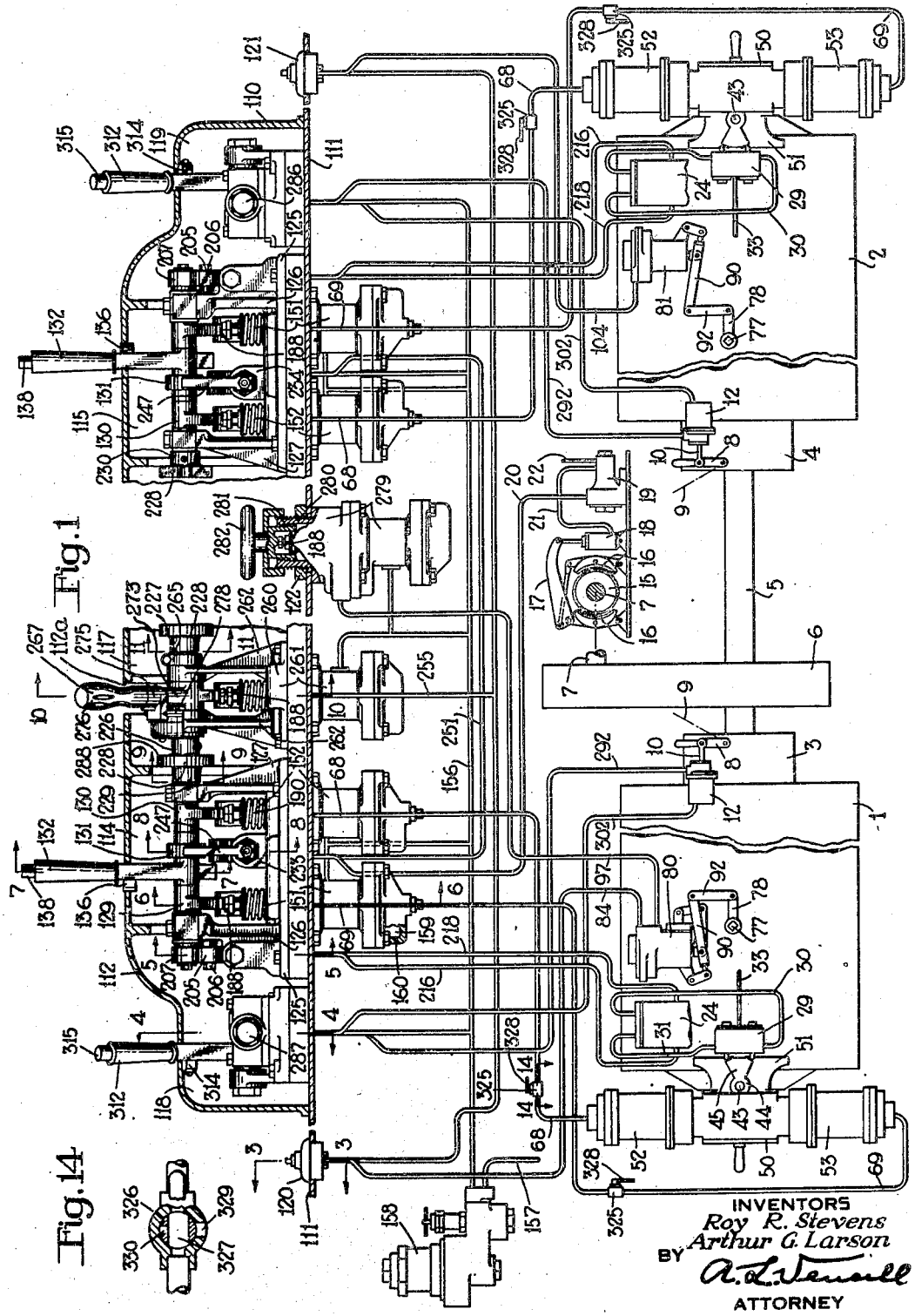

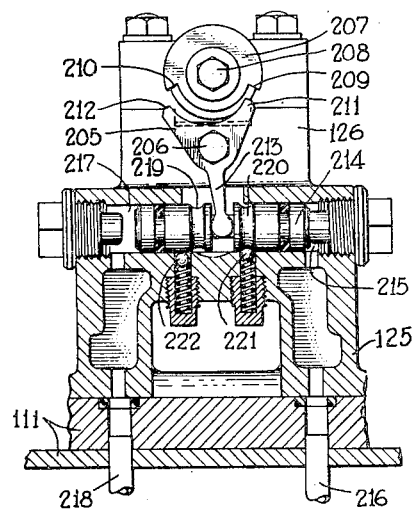
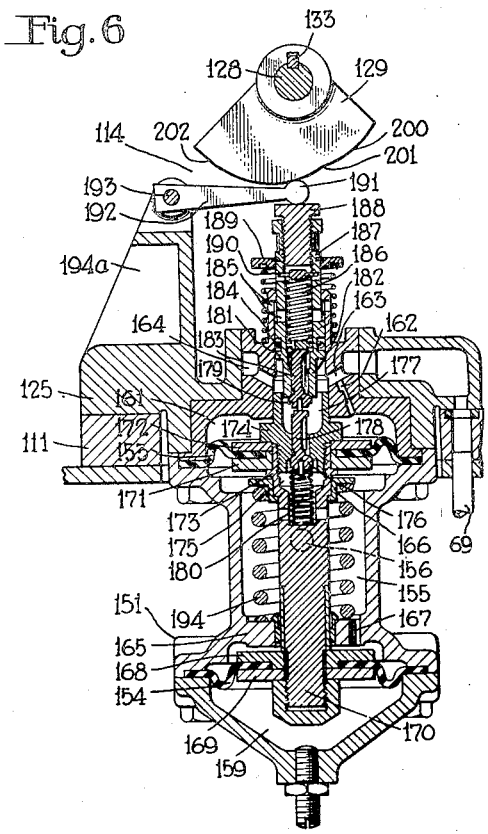
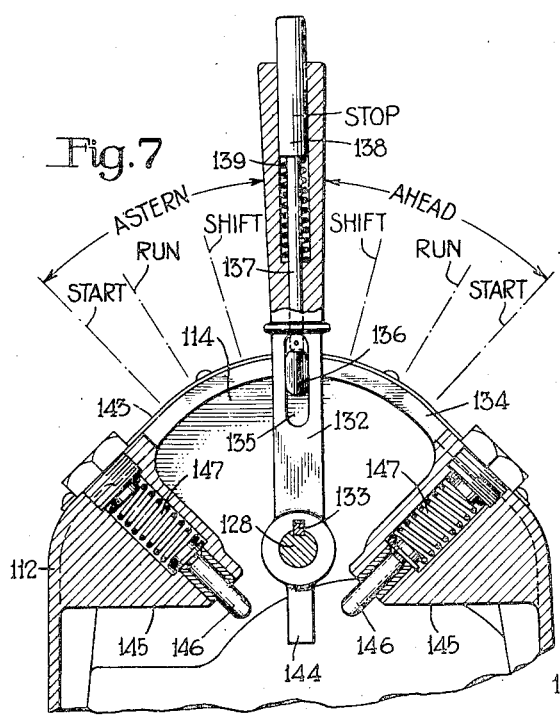
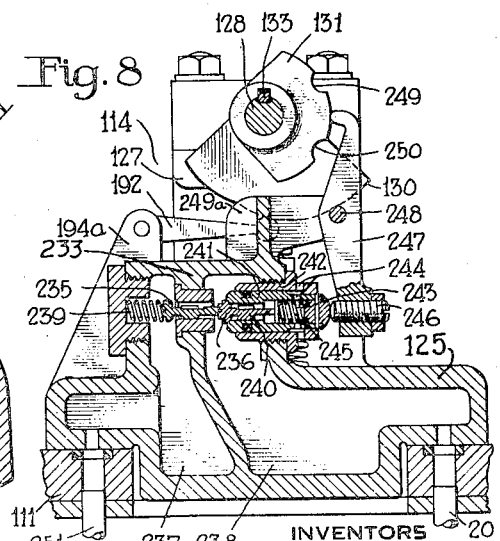

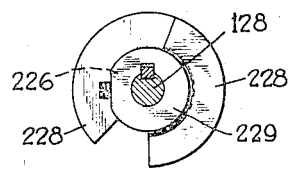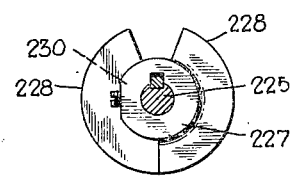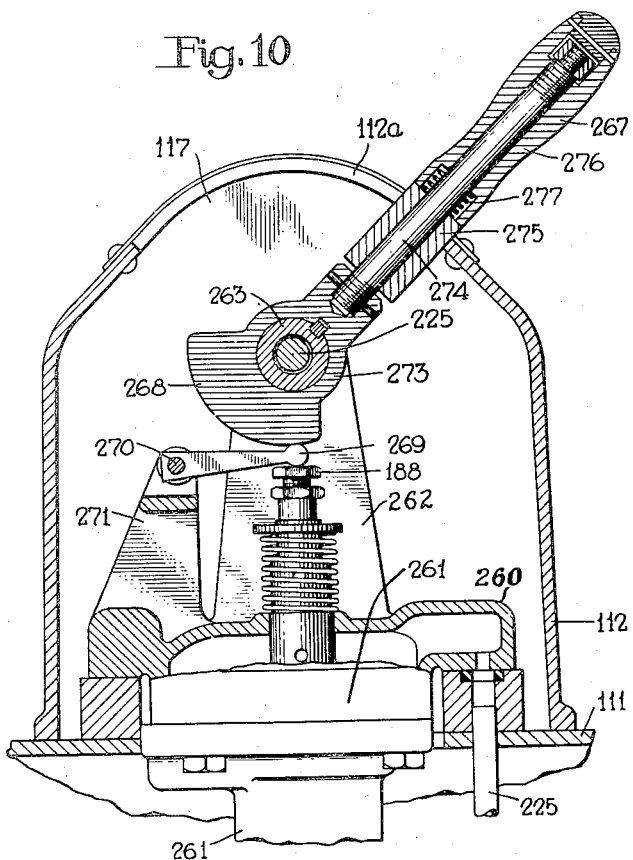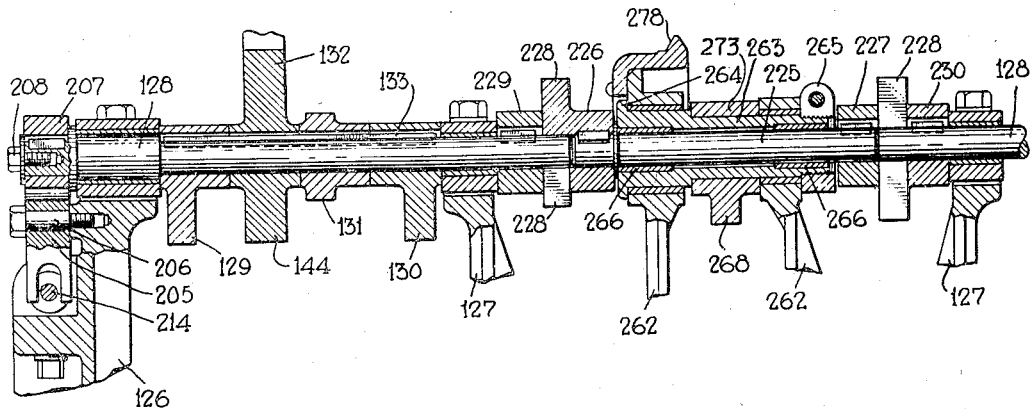

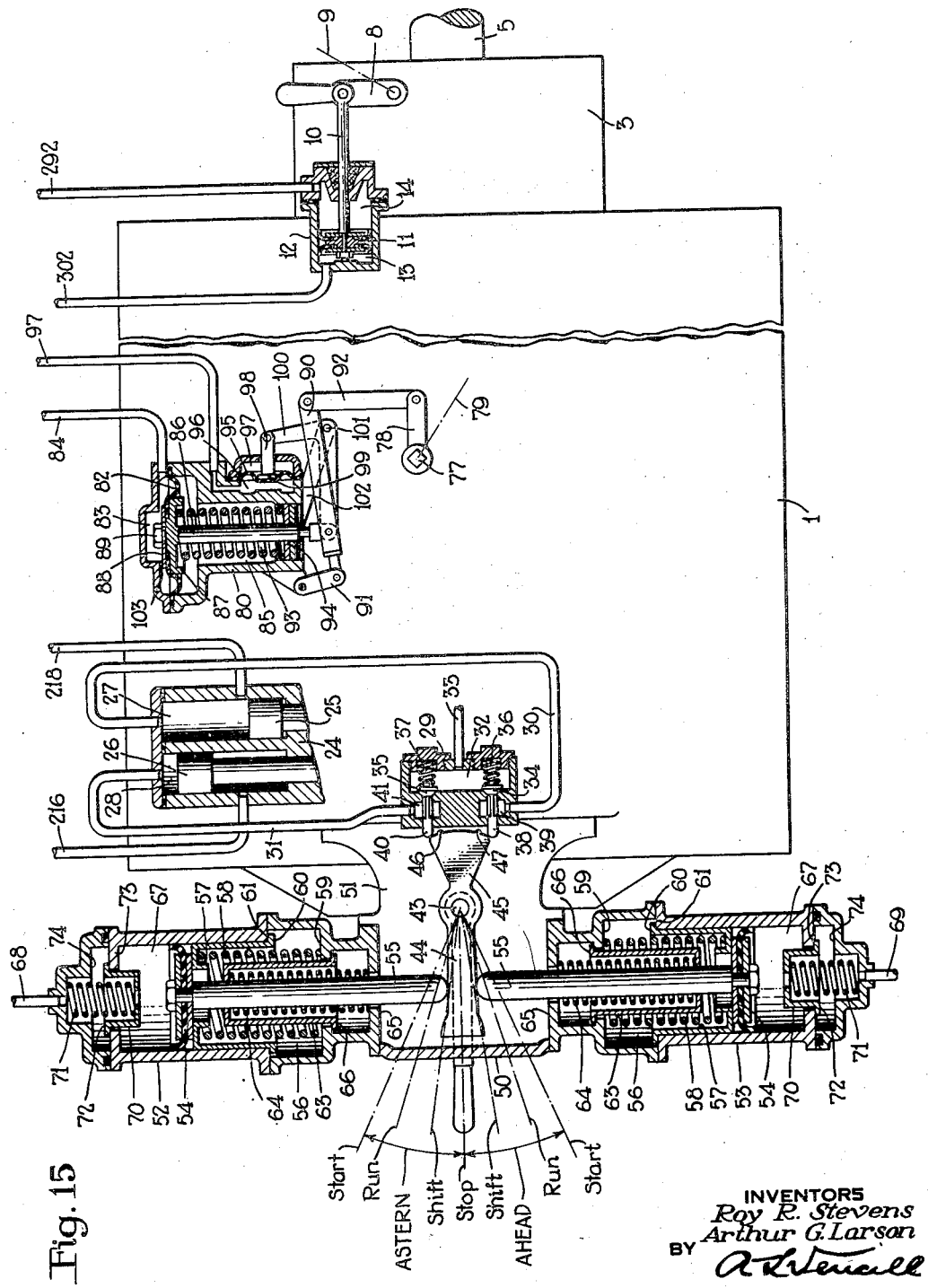

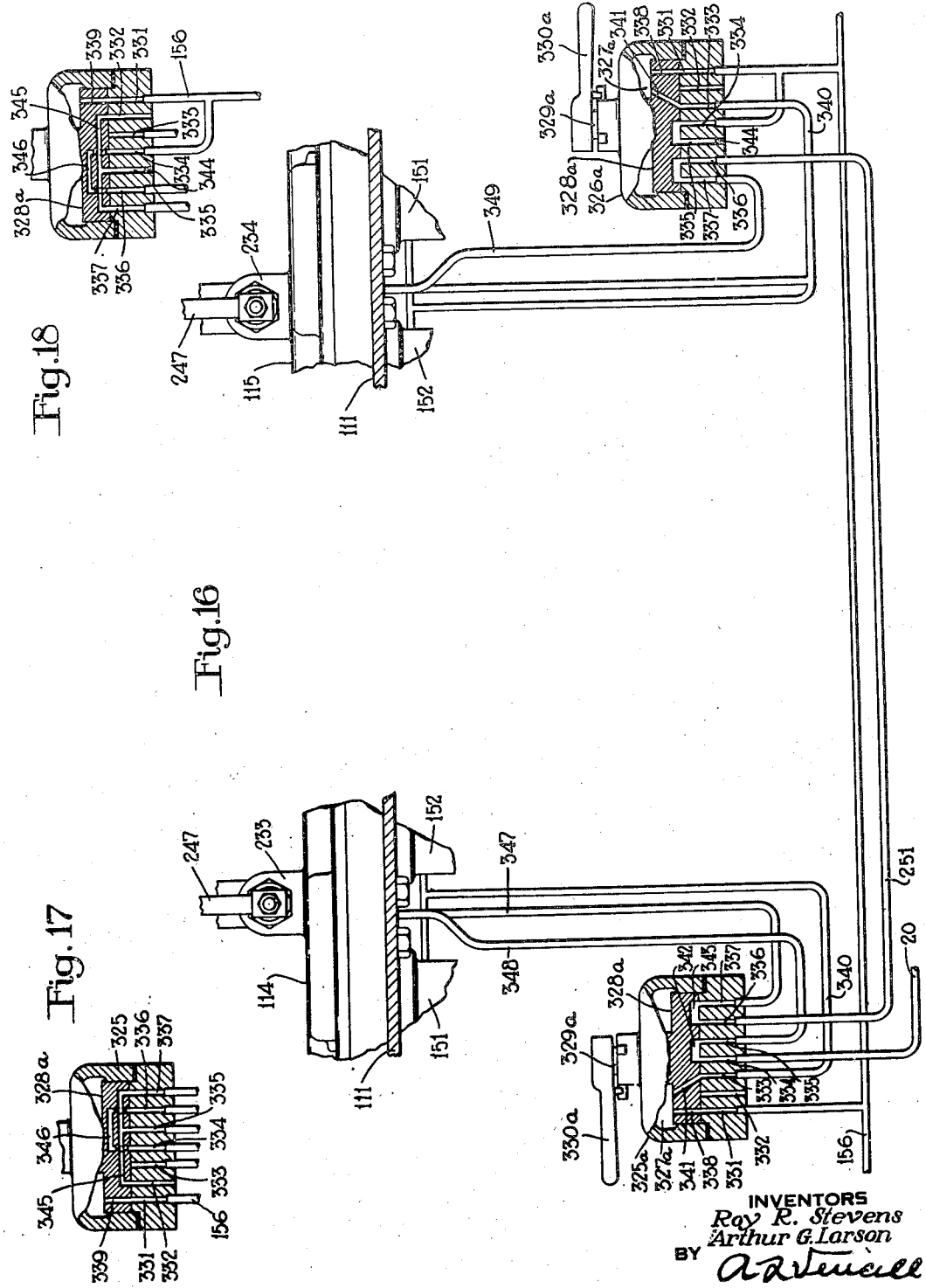

Patented Sept. 20, 1949

2,482,300

UNITED STATES PATENT OFFICE 2,482,300

CONTROL APPARATUS

Roy R. Stevens and Arthur G. Larson, Forest Hills, Pa., assignors to The Westinghouse Air Brake Company, Wilmerding, Pa., a corporation of Pennsylvania Application July 14, 1943, Serial No. 494,612

23 Claims. (Cl. 60—97)

1

This invention relates to control apparatus and more particularly to a propulsion system embodying a plurality of reversible propulsion engines.

One object of the invention is the provision of such a system providing for selective use of the engines either individually or in multiple.

Another object of the invention is the provision of a control apparatus for governing the individual starting, reversing, and speed or power output of a plurality of reversible engines, such as of the Diesel type, and so arranged as to prevent starting and operation of one engine in one direction while another engine is operating in the opposite direction.

Another object of the invention is the provision of an improved control system for a ship or the like powered by a plurality of engines of the Diesel type which may be connected to operate a common propeller, and which system provides for selective starting, reversing, and adjustment of the speed or power output of the individual engines and use of the engines either individually or in multiple for propelling the ship.

Another object of the invention is the provision of a control system as defined in any of the above objects embodying fluid under pressure as the controlling medium so as to provide for prompt and accurate control of the engines and their use.

Other objects and advantages will be apparent from the following more detailed description of the invention:

In the accompanying drawings; Fig. 1 is a diagrammatic view, partly in section and partly in outline, of the improved control system; Fig. 2 is a plan view of a control stand constituting a portion of the system shown in Fig. 1; Figs. 3 to 11 are sectional views taken on lines 3—3 to 11—11, inclusive and respectively, in Fig. 1; Fig. 12 is a longitudinal sectional view of a portion of a control stand shown in Figs. 1 and 2; Fig. 13 is a sectional view taken on line 13—13 in Fig. 3; Fig. 14 is a sectional view taken on line 14—14 in Fig. 1; Fig. 15 is an enlarged view, mainly in section, of one of the engines and control structure associated therewith shown in elevation in Fig. 1; Fig. 16 is a diagrammatic view partly in section and partly in outline of a portion of the control system not shown in Fig. 1; and Figs. 17 and 18 are diagrammatic views of two control valves shown in Fig. 16 but in different positions.

2

Description

Referring to Fig. 1, the improved propulsion system comprises a plurality of reversible engines 1 and 2 of the Diesel type connected by clutches in the form of fluid couplings 3 and 4, respectively, to a common drive shaft 5 which is connected through a reduction gear 6 to a single ship's propeller shaft 7. By this arrangement the propeller of the ship may be driven in either direction by both engines 1 and 2 upon filling both fluid couplings, or by either engine individually upon filling the respective fluid coupling and draining the other fluid coupling, by any conventional filling and draining mechanism.

The filling and draining mechanism for each of the fluid couplings 3 and 4 may be controlled by a lever 8 having, what may be termed, a dump position for draining the coupling and a fill position for filling the coupling. In the drawing the lever 8 of each coupling is shown in the dump position, while the fill position of the lever is indicated by a dot and dash line 9. Each lever 8 is connected by a rod 10 to a piston 11 contained in a cylinder 12 and having at one side a pressure chamber 13 and at the opposite side a pressure chamber 14, as shown in Fig. 15. With chamber 14 charged with fluid under pressure and with fluid under pressure released from chamber 13, the piston 11 will move to the position shown in Fig. 15 for pulling lever 8 to the dump position. With chamber 13 charged with fluid under pressure and with fluid under pressure released from chamber 14, the piston 11 will move to the opposite end of the cylinder 12 for placing lever 8 in the fill position indicated by dot and dash line 9.

A brake is associated with the propeller shaft 7 for braking said shaft, the propeller (not shown), and, through the medium of the reduction gear 6, the drive shaft 5. This brake may comprise a brake drum 15 mounted on shaft 7, friction brake shoes 16 for engaging said drum, a lever 17 for operating said shoes into and out of engagement with said drum, and a fluid pressure responsive brake cylinder 18 for controlling said lever. Supply of fluid under pressure to cylinder 18 is arranged to apply the brake shoes to the drum while the shoes will be released from the drum upon release of fluid under pressure from said cylinder.

A relay valve device 19, of any suitable structure, arranged for control by fluid under pressure in a pipe 20, is provided for controlling, through a pipe 21, the operation of the brake cylinder 18. Upon supply of fluid under pressure to pipe 20, the relay valve device 19 will operate to supply fluid under pressure from any suitable source, such as a pipe 22, to cylinder 18, while upon release of fluid under pressure from pipe 20, the relay valve device 19 will operate to release fluid under pressure from cylinder 18. Structures of this general type are so well known that no further description thereof is deemed essential in the present application.

Each of the Diesel engines 1 and 2 may be of any conventional reversible type embodying cam shafts (not shown) which are shiftable to one position to provide for operation of the engine in one direction and to another position to provide for operation of the engine in the reverse direction. For shifting the cams, each engine may be provided with a fluid motor 24 embodying a ram 25 (Fig. 15) operable by fluid under pressure to condition the cam shaft to provide for operation of the engine in one direction, as for instance to cause movement of the ship in an astern direction. Each motor 24 may also embody a ram 26 operable by fluid under pressure to condition the cam shaft to provide for operation of the engine in the reverse direction, for obtaining ahead movement of the ship. The ram 25 has at one side a pressure chamber 27 to receive actuating fluid, and said ram is shown in Fig. 15 in the position to which it will be moved by such fluid for conditioning the cam shaft for astern movement of the ship. The ram 26 is shown in the position which it will assume upon positioning the cam shaft for astern movement of the ship, and has at one side a pressure chamber 28. Supply of fluid under pressure to chamber 28 with chamber 27 vented will cause movement of ram 26 to a position in its cylinder corresponding to the position in which ram 25 is shown in the drawing to provide for movement of the ship in the opposite or ahead direction. Movement of either ram by fluid under pressure to its cam shifting position, in which ram 25 is shown, will move the other ram to its other position, in which ram 26 is shown, by means not shown in the drawing and not pertinent to the invention.

At each engine a valve device 29 is provided for controlling the supply and release of fluid under pressure to and from the ram chambers 27 and 28 by way of pipes 30 and 31, respectively. As shown in Fig. 15, this valve device may comprise a casing having a chamber 32 arranged to be constantly supplied with fluid under pressure from any suitable source by way of a pipe 33. Chamber 32 contains two poppet valves 34 and 35 which are normally urged to a seated or closed position by springs 36 and 37, respectively. The valve 34 has a stem 38 extending through a bore connecting chamber 32 to a chamber 39 and thence through chamber 39 and a wall thereof to the exterior of the casing. The valve 35 has a stem 40 extending through a chamber 41 to the exterior of the casing. The valve stems 38 and 40 are arranged in parallel spaced relation. The portion of valve stems 38 and 40 adjacent the valves and extending into chambers 39 and 41, respectively, are fluted to allow flow of fluid under pressure to said chambers from chamber 32 upon unseating of the valves. The remainder of the valve stems are cylindrical in form and the fit therebetween and the respective bores is such as to prevent any material loss of fluid under pressure from chambers 39 or 41 when the valves are open, but to allow release of fluid under pressure from said chambers by way of clearance space around the stems when the valves are closed.

The chambers 39 and 41 are connected respectively to pipes 30 and 31, and it will be evident that if valve 34 is opened with valve 35 closed, fluid under pressure will be supplied to actuate ram 25, while the ram chamber 28 will be vented to atmosphere past the stem 40 of valve 35. If valve 35 is open with valve 34 closed, fluid under pressure will be supplied to actuate ram 26, while chamber 27 above ram 25 will be vented to atmosphere past the stem of valve 34.

Each engine is provided with a conventional maneuvering gear which may comprise a rock shaft 43 and a lever 44 for rocking said shaft to control the starting, stopping, and reversing of the engine. As indicated by legends in Fig. 15, the lever 44 has a neutral or "Stop" position, and at one or an "Ahead" side thereof, a "Shift" position, a "Run" position, and a "Start" position, and at the opposite or an "Astern" side oppositely arranged "Shift," "Run," and "Start" positions; the two "Shift" positions being arranged immediately adjacent the "Stop" position and the "Start" positions most remote.

The lever 44 associated with each engine is provided with an operating member 45 disposed to rock in directions across the ends of valve stems 38 and 40 of the respective valve device 29. The member 45 has a raised portion 46 arranged to unseat valve 35 in and only in the "Shift" position of lever 44 at the "Ahead" side of "Stop" position, and another raised portion 47 arranged to unseat valve 34 in and only in the other "Shift" position. It will thus be seen that if lever 44 is moved in the "Ahead" direction to "Shift" position, the valve 35 will operate to supply fluid under pressure to move the ahead ram 26 to its inner position, while the astern ram 25 will move to its outer position, for thereby setting the cams in the engine to provide for starting in a direction to cause ahead movement of the ship. If lever 44 is, however, moved in the "Astern" direction to "Shift" position, the valve 34 will be operated to supply fluid under pressure to move the astern ram 25 to its inner position and allow movement of ram 26 to its outer position, shown in the drawing, to thereby provide for starting of the engine in the opposite direction. In use, it is desired that lever 44 of engine 1 remain in the "Shift" position at the selected side of "Stop" position until after the respective ram 26 or 25 has moved to its innermost position, and then the lever may be moved further to the "Start" position to cause starting of the engine in the selected direction. After the engine is thus started, the lever 44 will be moved back to the adjacent "Run" position in which it will be carried until it is subsequently desired to stop or reverse the engine.

The lever 44 associated with engine 2 has the same control positions as that associated with engine 1, and is operable upon movement to such positions to control the starting, stopping, and reversing of said engine in the same manner as above described in connection with engine 1.

An actuator 50 is associated with each of the engines for moving the maneuvering gear lever 44 to its different positions. Each actuator comprises a bracket 51 secured to the respective engine, an ahead motor 52 mounted on said bracket at one side of said lever, and an astern motor 53 mounted on said bracket at the opposite side of said lever.

The motors 52 and 53 may be identical in construction and each comprises a piston 54 and a rod 55 projecting from one side of said piston through a non-pressure chamber 56 for contact with the adjacent side of lever 44. Encircling the rod 55 within each non-pressure chamber 56 is a movable stop 57 and a coil spring 58 under a chosen degree of pressure and bearing at one end against said stop and supported at the opposite end on a shoulder 59 in the casing. One end of stop 57 is arranged for contact with piston 54, while at the opposite end is an outturned collar 60 for contacting a shoulder 61 in the casing to limit movement of the stop by spring 58 but providing for movement of said stop and of the piston against said spring in the direction of lever 44. With collar 60 in contact with shoulder 61 and piston 54 in contact with stop 57, the end of piston rod 55 will just engage the lever 44 when the lever is in its "Stop" position as shown in Fig. 15.

Each motor 52 and 53 further comprises a movable stop 63 encircling rod 55 within spring 58. A precompressed spring 64 encircling rod 55 within stop 63 bears at one end against said stop urging same in the direction of the respective piston 54, while the opposite end of said spring is supported on an annular shoulder 65 in the casing. The stop 63 is provided at one end with an annular collar 66 arranged to cooperate with shoulder 59 in the casing to limit movement of said stop by spring 64 but providing for movement of said stop in the direction against said spring.

With the stops 57 and 63 in contact at one end with shoulders 61 and 59, respectively, in the casing, the opposite ends of said stops are spaced from each other a distance equal to the degree of movement of lever 44 between the "Stop" position and either "Shift" position at the point of contact between said lever and either piston rod 55. In the "Shift" position of lever 44 at the "Ahead" side of "Stop" position, the stop 57 is arranged to engage stop 63 in motor 52 while in the other "Shift" position the corresponding stops in motor 53 are arranged to engage each other.

Piston 54 in each of the two motors 52 and 53 has at its outer face a pressure chamber 67, which in motor 52 is connected to an ahead control pipe 68, while in the motor 53 chamber 67 is connected to an astern control pipe 69. A movable stop 70 is urged by a precompressed spring 71 into each pressure chamber 67 for engagement by the respective piston 54, said stop having an annular flange 72 arranged to engage a shelf 73 in the casing for limiting such inward movement but providing for movement in the opposite direction against the respective spring. With collar 72 on stop 70 in motor 53 in contact with the casing shelf 73 the opposite end of said stop is disposed for engagement with piston 54 in said motor to define the "Run" position of lever 44 at the "Ahead" side of "Stop" position. Piston 54 in motor 53 is movable against stop 70 to a position in which said stop engages a surface 74 in the casing which defines the "Start" position of lever 44 at the "Ahead" side of "Stop" position. "Run" and "Start" positions of lever 34 at the "Astern" side of "Stop" position are defined in a like manner by the corresponding parts of motor 52.

The operation of the two actuators 50 is identical and controlled by different pressures of fluid provided in pressure chambers 67 of the two motors 52 and 53 through the respective ahead and astern control pipes 68 and 69 in a manner which will be later described. By reference to Fig. 15 the operation of the actuator 50 associated with engine 1 will now be described.

When the engine 1 is stopped, fluid at a chosen pressure, such as twenty pounds per square inch, is provided through both the ahead and astern control pipes 68 and 69 in pressure chambers 67 to act on pistons 54 in the two motors 52 and 53, and this pressure of fluid moves said pistons into contact with stops 57. The springs 58 exert a pressure on stops 57 sufficiently in excess of this pressure of fluid on pistons 54 as to maintain collars 60 on said stops in contact with shoulders 61 in the casing and thus hold pistons 54 against movement past the positions in which they are shown in the drawing. In this position of pistons 54 the ends of the piston rods 55 engage the opposite sides of lever 44 and thus hold said lever in its "Stop" position.

To move the lever 44 from "Stop" position to "Shift" position at the "Ahead" side of "Stop" position to provide for starting of the engine in a direction to cause ahead movement of the ship, the astern control pipe 69 is opened to the atmosphere for relieving pressure of fluid in chamber 67 in the motor 53, while fluid at a chosen pressure, such as thirty-five pounds per square inch, is supplied through the ahead control pipe 68 to chamber 67 in motor 52. This pressure acting on piston 54 in motor 52 overcomes the opposing force of spring 58 and moves said piston against said spring to a position in which stop 57 contacts the movable stop 63. The pressure of spring 64 on stop 63 acting in conjunction with that of spring 58 on stop 57 sufficiently exceeds the opposing fluid pressure now present in chamber 67 on piston 54, as to prevent further movement of said piston in an inward direction, and movement of said piston to this position moves the lever 44 to "Shift" position at the "Ahead" side of "Stop" position for thereby actuating the valve device 29 to supply fluid to the ahead ram 26 for effecting movement thereof to its innermost position for conditioning the cams in the engine to provide for starting same in a direction to obtain ahead movement of the ship.

After the lever 44 has been moved to "Shift" position at the "Ahead" side of start position, the pressure of fluid in chamber 67 in motor 52 is increased to a certain maximum degree such as one-hundred pounds per square inch, and this pressure acting on piston 54 in said motor then moves said piston against the opposing force of both springs 58 and 64 into contact with movable stop 70 in motor 53, and then moves said stop to the position in contact with surface 74 in the casing. In this position of the piston 54 in motor 53 the lever 44 will be in the "Start" position at the "Ahead" side of "Stop" position for causing starting of the engine in any conventional manner. After the engine is started, the pressure of fluid in chamber 67 in motor 52 is reduced to a chosen degree such for example as fifty-five pounds, and this pressure acting on piston 54 in said motor produces a force less than the combined forces of springs 64 and 58 in said motor plus that of spring 71 in motor 53, but exceeding the combined forces of the two first named springs, whereby the spring 71 in motor 53 moves the piston 54 therein and thereby piston 54 in motor 52 to a position in which collar 72 on stop 70 in motor 53 engages shelf 73, in which position the lever 44 will be in its "Run" position at the "Ahead" side of "Stop" position. The lever 44 will then be maintained in this "Run" position by pressure of fluid in chamber 67 in motor 52 and the opposing force of spring 71 on stop 70 in motor 53, and will remain in said position even in case of failure of the fluid pressure in chamber 67 in motor 52, as will be apparent.

To return lever 44 to "Stop" position for stopping the engine, the pressure of fluid in the ahead control pipe 68 is reduced to twenty pounds which permits spring 58 to return piston 54 in motor 52 to the position shown in the drawing, while fluid pressure is supplied to the astern control pipe 69 to the same degree (twenty pounds) to move piston 54 in motor 53 to the position in contact with stop 57, this movement of the latter piston moving the lever 44 back to "Stop" position.

To move lever 44 to its different positions at the "Astern" side of "Stop" position, fluid at the different pressures such as thirty-five pounds, one hundred pounds, and fifty-five pounds are successively provided through the astern control pipe 69 in pressure chamber 67 of motor 53 and the pressure in the ahead control pipe 68 is reduced whereby the piston 54 in motor 53 will operate to position lever 44 in a manner which will be apparent from the above description. Return of lever 44 from "Run" position at the "Astern" side of "Stop" position to "Stop" position may be accomplished by providing fluid at twenty pounds pressure through the ahead control pipe 68 in pressure chamber 67 of the ahead motor 52 upon a reduction in pressure in said chamber in motor 53 to a like pressure, as will also be apparent from the above description.

The reference numeral 77 applied to each engine indicates a speed governor control shaft which is rockable to vary the amount of fuel supplied to the engine and thereby the speed or power output thereof. A lever 78 is connected at one end to shaft 77 for rocking same, said lever being shown in the drawing in a position for providing operation of the engine at an idling speed, and being rockable from this position to increase the speed or power output of the engine, the maximum speed or output being attained in a position of the lever such as indicated by a dot and dash line 79 in Fig. 15.

A fluid pressure controlled speed regulating device 80 is provided for controlling the adjustment of lever 78 associated with engine 1, and a similar device 81 is provided for controlling the adjustment of the corresponding lever 78 associated with engine 2.

As shown in Fig. 15, the regulating device 80 comprises a casing containing a flexible diaphragm 82 having at one side a pressure chamber 83 open to a speed control pipe 84 and having at the opposite side a non-pressure chamber 85. Extending through the non-pressure chamber 85 is a rod 86 having on one end a follower 87 engaging one side of the diaphragm and secured thereto by a plate 88 engaging the opposite face of the diaphragm and a cap screw 89 extending through said plate and secured to said follower. The opposite end of rod 86 is pivotally connected to a lever 90 intermediate its ends. One end of this lever is pivotally connected to one end of a link 91 the opposite end of which is pivotally connected to the casing. The opposite end of lever 90 is pivotally connected to one end of a link 92, the opposite end of which is connected to the governor shaft operating lever 73. The non-pressure chamber 85 also contains a control spring 93 encircling rod 86 and bearing at one end against diaphragm follower 87. The opposite end of spring 93 is supported on a nut 94 adjustably secured in the casing.

A flexible vernier diaphragm 95 is clamped to one side of the casing of the device, and has at one side a pressure chamber 96 open to a control pipe 97. At the opposite side of diaphragm 95 is a non-pressure chamber 97' through which extends a plunger 98, one end of which is provided with a follower 99 engaging the diaphragm. The opposite end of plunger 98 is pivotally connected to one end of a bell crank 100 which is pivotally supported at its knee on a pin 101 secured in a bracket 102 projecting from the casing. The opposite end of bell crank 100 is pivotally connected to rod 86 at its connection with lever 90. The non-pressure chamber 97' is constantly open to the atmosphere through clearance space provided around plunger 98.

The speed regulating device 81 associated with engine 2 is identical to the speed or regulating device 80 associated with engine 1 with the exception that the vernier diaphragm 95 and bell crank 100 connecting said diaphragm to the rod 86 are omitted and with the further exception that the diaphragm pressure chamber 83 is connected to a control pipe 104.

The operation of the regulating device 80 is as follows:

Normally, chamber 96 at one side of the vernier diaphragm 95 is charged with fluid at a certain chosen degree of pressure such as twenty-five pounds through pipe 97 in a manner which will be later described. With chamber 83 above diaphragm 82 open to the atmosphere by way of pipe 84, also in a manner which will be later described, the pressure of fluid on the vernier diaphragm 95 transferred through the bell crank 100 to rod 86 plus the pressure of spring 93 on follower 87 moves the diaphragm 82 to a position defined by contact with a stop 103. In this position of diaphragm 82 and rod 86, the lever 90 assumes the position shown in the drawing for positioning the speed regulating lever 78 in its engine idling position.

If fluid under pressure is now supplied through pipe 84 to chamber 83 above diaphragm 82, said diaphragm will deflect against the opposing pressure of spring 93 to a position in which the increased pressure of said spring counterbalances the pressure of such fluid. This movement of the diaphragm 82 and rod 86 rocks the lever 90 and thus the lever 78 to a corresponding position out of idling position for causing acceleration of the engine to a degree determined by the pressure of fluid provided in chamber 83. A further increase in pressure of fluid in chamber 83 will cause movement of the speed regulating lever 78 to cause a corresponding further increase in speed or power output of the engine, while a reduction in pressure in chamber 83 will result in movement of lever 78 to effect a corresponding reduction in speed or power output of the engine, as will be apparent. Movement of the follower 87 into contact with the casing upon supply of fluid through pipe 84 to chamber 83 at a certain maximum pressure will cause movement of the speed regulating lever 78 to the position indicated by dot and dash line 79 for causing operation of the engine at maximum speed or power output.

The speed or regulating device 81 associated with engine 2 operates to control the speed of said engine in the same manner as the speed of engine 1 is adjusted by operation of the regulating device 80 as so far described, and it will be apparent that if fluid at the same degree of pressure is simultaneously provided in chamber 83 of both of said regulating devices, said devices will simultaneously operate to cause like adjustments of the speed regulating levers 78 of the two engines.

If the speed or power output of the two engines are being simultaneously controlled as just mentioned, and in a manner which will be later described, it is possible that the speed or power output of one engine may be slightly different from that of the other due to differences in adjustments of various parts of the engines or for other reasons. In order to obtain exactly the same speed or power output of the two engines, or to vary the speed or power output of engine 1 relative to that of engine 2 under such a condition, the pressure of fluid in chamber 96 effective on the vernier diaphragm 95 may be varied to effect a slight change in adjustment of the speed regulating lever 78 of engine 1. A decrease in pressure in the vernier diaphragm chamber 96 will allow the pressure of fluid in chamber 83 acting on diaphragm 82 to rock lever 90 further in a clockwise direction for thereby actuating the speed regulating lever 78 to increase the speed or power output of the engine in accordance with the change in pressure in said chamber 96. On the other hand, an increase in pressure in chamber 96 will act to move lever 90 in a counterclockwise direction for effecting a corresponding reduction in speed or power output of the engine, such change in speed or power output of engine 1 being relative to that of engine 2 whereby the engine 1 may be brought into synchronism with engine 2, or its speed or output may be adjusted relative to that of engine 2 to any desired degree.

The vernier diaphragm 95 is of relatively small area as compared to that of diaphragm 82 and a relatively great degree of variation in pressure of fluid on diaphragm 95 will therefore be effective to cause only slight change in adjustment of the speed or power output of the engine, such for example as five per cent either above or below that provided by operation of the diaphragm 82, for the purpose of synchronizing as above mentioned.

A control stand 110 is provided embodying means for controlling the two maneuvering gear actuators 50, speed regulating devices 80 and 81, and the fluid clutches 3 and 4 of the engines 1 and 2, respectively, and for also controlling operation of the brake control relay valve device 19. A plan view of the control stand is shown in Fig. 2, while a substantially vertical sectional view through said stand is shown in Fig. 1, this latter view however being shown separated horizontally into two parts and somewhat in diagrammatic form for the purpose of clarity.

The control stand 110 comprises a rigidly supported mounting plate 111, a cover 112 secured to said mounting plate, and sides and end parts (not shown). Mounted on the side of the control stand which on a ship would be at the astern side of the stand is a bar 113 for the operator to grip.

Mounted on mounting plate 111 within the cover 112 are two manually operative maneuvering control devices 114 and 115 for controlling the actuators 50 of engines 1 and 2, respectively, and for jointly controlling the brake control relay valve device 19, a single speed control device 117 for controlling both of the speed regulating devices 80 and 81, and two clutch control devices 118 and 119 for controlling the fluid couplings 3 and 4, respectively. Mounted on the mounting plate 111 outside of and in front of cover 112, as seen in Fig. 2, are two selector valve devices 120 and 121 for rendering the speed regulating devices 80 and 81 either responsive or non-responsive to operation of the speed control device 117, and a vernier control valve device 122 for controlling operation of the vernier diaphragm 95 of the speed regulating device 80.

*Description of maneuvering control devices 114 and 115*

The two maneuvering control devices 114 and 115 are of identical structure except arranged partly in reverse end to end relation, and the following description of the control device 114 will therefore apply to both.

The maneuvering control device 114 comprises a base member 125 mounted on the mounting plate 111 and having two spaced upstanding brackets 126 and 127. Extending between these brackets and journaled therein is an operating shaft 128 (Fig. 12). Mounted on shaft 128 are two reversely arranged but otherwise identical cams 129 and 130 disposed against the brackets 126 and 127, respectively. A cam 131 is mounted on shaft 128 against the cam 130, and a lever 132 is mounted on said shaft between the cams 129 and 131. A key 133 secures the several cams to turn with shaft 128 and connects said shaft to the lever 132 for movement thereby.

The lever 132 extends through a slot 134 provided in cover 112 to a point above said cover for gripping and movement by an operator. The lever 132 has a slot 135 (Fig. 7) extending longitudinally thereof and slidably mounted in this slot is a latch 136 disposed mainly within the cover and connected by a rod 137 to a plunger 138 of greater diameter and which extends beyond the end of said lever. Within the lever is a spring 139 acting on the plunger 138 urging the latch 136 outwardly of the lever. Manual pressure applied to the end of plunger 138 will move the latch 136 against the opposing pressure of spring 139 into the cover.

The latch 136 extends from one side of the lever in a direction parallel to shaft 128, and the cover is provided with a notch 140 (Fig. 2) open to the slot 134 and arranged to receive the latch 136 in a vertical position of the lever. At one side of notch 140 is another notch 141 open to slot 134 for receiving latch 136 in another position of said lever, and at the opposite side of notch 140 is a third notch 142 open to the slot 134 for receiving said latch in a corresponding position of said lever at the opposite side of its vertical position. The slot 134 provides for movement of the lever beyond the notch 141 and beyond the notch 142. Movement of latch 136 inwardly of the cover by manual pressure applied to plunger 138 releases the lever for movement in slot 134, while release of manual pressure on plunger 138 renders the spring 139 effective to move the latch 136 into one or another of the notches 140 to 142, depending upon the position of said lever, for securing same against undesired movement.

A plate 143 extending parallel to slot 134 is secured to cover 112 at one side of said slot and bears at the end adjacent the operator's holding bar 113, a legend "Ahead" and at its opposite end a legend "Astern." Adjacent the notch 140 the plate 143 bears the legend "Stop." The notch 141 is provided adjacent a legend "Run" at the "Astern" side of "Stop" position while a legend "Start" is provided beyond this "Run" position and thus beyond notch 141. Corresponding legends "Run" and "Start" are provided at the opposite side of "Stop" position. It will thus be apparent that the latch 136 is provided for locking the lever 132 in its "Stop" position and in the two "Run" positions, but not in the two "Start" positions. It will also be noted that the legends applied to plate 143 correspond to the positions of the maneuvering gear lever 44 of the engines except there are no "Shift" positions on said plate. Positions of the control lever 132 corresponding to these "Shift" positions are obtained immediately out of and at opposite sides of the "Stop" position on plate 143.

The lever 132 has an arm 144 disposed below the shaft 128. At either side of this arm the cover 110 is provided with an inwardly extending boss 145 in which is slidably mounted a diagonally arranged plunger 146 the inner end of which is disposed in the path of movement of arm 144. Each of the plungers 146 is subject to the pressure of a spring 147 urging same in the direction of the lever arm 144. With the two plungers 146 urged to their outermost position by springs 147, as shown in Fig. 7, the arm 144 is arranged to engage one or the other of said plungers when the lever 132 is in either one or the other of its two "Run" positions. Movement of the lever from either "Run" position to the adjacent "Start" position actuates arm 144 to move the respective plunger 146 inwardly of the respective boss 145 against the force of the associated spring 147. Upon removal of manual force on lever 132 in either "Start" position, the respective spring 147 will actuate the plunger 146 to return said lever to the adjacent "Run" position whereby said lever cannot inadvertently be left in either of its "Start" positions.

The cam 129 is provided for controlling operation of an automatic or self-lapping fluid pressure control regulating valve device 151, while the cam 130 is provided for controlling operation of a like self-lapping valve device 152, said valve devices being disposed below said cams between the brackets 126 and 127, and the base member 125 constituting a portion of both of said devices.

Each of the self-lapping valve devices 151 and 152 may comprise, as best shown in Fig. 6, two coaxially aligned and spaced flexible diaphragms 153 and 154 which preferably are of the same areas. Below diaphragm 153 is a fluid pressure supply chamber 155 which, in use, is constantly supplied with fluid under presure from a supply pipe 156. The pipe 156 in turn is supplied with fluid at a desired reduced pressure from any suitable source such as a pipe 157 Fig. 1) by operation of a suitable reducing valve device 158. Below the diaphragm 154 is a chamber 159 which is in constant communication with the atmosphere by way of a port 160 (Fig. 1). Above diaphragm 153 is a chamber 161 connected through a stabilizing choke 162 and a plurality of ports 163 to a chamber 164. In the self-lapping valve device 151 chamber 164 is connected to pipe 69, while in the self-lapping valve device 152 said chamber is connected to pipe 68 (Fig. 1).

The central portion of diaphragm 154 is clamped between follower plates 168 and 169 secured to one end of a strut 170 which extends through chamber 157 and centrally through the diaphragm 153 to which it is rigidly clamped centrally between two plates 171 and 172 secured between a shoulder 173 on said stem and an annular collar provided on a nut 174 having a screw-threaded engagement with the end of the stem.

A spring 194 contained in chamber 155 is supported at one end on a web 165 in the casing, while the opposite end bears against seat 166 on strut 170 to oppose downward movement of said strut. An opening 167 through web 165 connects chamber 155 to the space above diaphragm 154.

Below the nut 174 and within the strut 170 is a chamber 175 constantly open to the fluid pressure supply chamber 155 and containing a supply valve 176 arranged to control communication between said chambers and a bore leading to a chamber 177 at the opposite side of said nut and which latter chamber is in constant communication through the ports 163 with chamber 164. The supply valve 176 has a fluted stem 178 extending through this bore into chamber 177 wherein it contacts a release valve 179. A spring 180 in chamber 175 acts on the supply valve 176 for urging it to its closed position shown in the drawing.

A plunger 181 is slidably mounted in a bore provided above the release valve 179 in axial relation to the two diaphragms. This plunger has a depending portion 182 provided at its lower end with a seat for engagement by the release valve 179. The release valve 179 has a fluted stem 183 extending into an axial bore in plunger 181 which bore is open through a plurality of ports 185 to the atmosphere. A spring 186 in this bore acts on the release valve stem 183 for holding the release valve against movement upon movement of plunger 181 in a direction away from said valve to effect opening of a release communication past said valve between chamber 164 and the atmosphere.

The plunger 181 is provided with an annular groove in its periphery containing a seal ring 184 having sliding contact with the wall of the bore in which it operates for preventing leakage of fluid under pressure from chamber 177 at one side of the plunger to the atmospheric ports 185. The plunger 181 is also provided with an upwardly extending axial portion 187 projecting above the casing and in the end of which is secured an operating screw 188. Secured to the upper end of the plunger portion 187 is a spring seat 189 engaged by one end of a bias spring 190 the opposite end of which is supported on the casing.

In the self-lapping valve device 151 the operating screw 188 is disposed directly below the axis of cam 129, while in the self-lapping valve device 152 said screw is correspondingly disposed below the cam 130. An operating connection between each screw 188 and the respective cam 129 or 130 is provided by a ball or cylinder 191 on one end of an arm 192, the opposite end of which is pivotally mounted on a pin 193 secured in a projection 194a of the casing.

In operation, the vertical disposition of screws 188, as determined by the identical but reversed cams 129 and 130 in the self-lapping control valve devices 151 and 152, determines the pressure of fluid which will be supplied by said devices to chambers 177, 161 and 164 and thereby to pipes 69 and 68, respectively, since the operation of both of these devices is identical. In view of this, the operation of only valve device 151 shown in section in Fig. 6 will be described in detail.

The cam 129 has a surface 200 formed at a given radius and which at a point designated by numeral 201 joins a cam surface 202 of gradually increasing radius. The surface 200 is arranged to engage the member 191 for positioning screw 188 in all positions of lever 132 at the "Ahead" side of "Stop" position from "Shift" position (Fig. 7) to "Start" position, in order to permit spring 190 to move the screw 188 to an extreme upper position. In "Stop" position of lever 132, the screw 188 will be displaced by surface 202 on cam 129 downwardly to the position shown in Fig. 6. In the "Shift" position at the "Astern" side of "Stop" position, the screw 188 will be displaced downwardly by surface 202 to a greater extent, while correspondingly greater degrees of downward displacement will be obtained in the "Run" and "Start" positions at the "Astern" side of "Stop" position.

With the screw 188 displaced to its uppermost position, the plunger 181 will be moved away from the release valve 179 by spring 190, and the control spring 194 will be fully expanded under which condition, the diaphragms 153 and 154 will be in a static condition due to being of the same areas and subject on their adjacent faces to the same pressure of fluid in chamber 157, and also subject to the same pressures on their outer faces, in chambers 159 and 161, since under this condition the latter chamber as well as chamber 164 and the connected pipe 69 will be open to the atmosphere past the release valve 179.

Movement of the lever 132 from the position in which the portion 200 of the cam surface is in engagement with the member 190 to its vertical or "Stop" position will displace the screw 188 to a certain degree in a downward direction from its uppermost position. This displacement is such as to move the plunger 181 into engagement with the release valve 179 and then shift said release valve for opening the supply valve 176, whereupon fluid under pressure will flow from chamber 155 past said supply valve to chamber 164 and thence to pipe 69. Fluid thus supplied to chamber 164 equalizes through the stabilizing choke 162 into chamber 161 above the diaphragm 153 to thereby act on said diaphragm in opposition to the pressure of control spring 194. As the pressure of fluid in pipe 69 and in chamber 161 is thus increased, it deflects the diaphragm 153 downwardly against spring 194 and relative to the supply valve 176 and finally into seating engagement with said valve for thereby limiting flow of fluid under pressure to pipe 69. The parts are so arranged that with the lever 132 in the vertical position, the pressure of fluid thus supplied to pipe 69 in "Stop" position of lever 132 will be limited to a degree such as twenty pounds. Movement of lever 132 from its vertical position to "Shift" position (Fig. 7) at the "Astern" side of "Stop" position will cause a further downward displacement of the regulating screw 188 and the self-lapping valve device 151 will operate to increase the pressure of fluid in pipe 69 to a chosen degree such as thirty-five pounds. Further movement of the lever 132 in the same direction to "Run" position will cause operation of the valve device 151 to increase the pressure of fluid in pipe 69 to a still higher degree, such as fifty-five pounds, while further movement of the lever to the "Start" position will cause operation of the valve device 151 to increase the pressure in pipe 69 to a still higher degree such as one-hundred pounds. In other words, the pressure of fluid acting in pipe 69 is dependent upon the position of cam 129 and thus of the operating lever 132.

The self-lapping valve device 152 is operative by cam 130 to provide the same degrees of fluid pressure in pipe 68 in the corresponding different positions of lever 132 at the "Ahead" side of "Stop" position, while in the "Shift" position of said lever and positions beyond "Shift" position at the "Astern" side of "Stop" position, the valve device 152 will open pipe 68 to the atmosphere.

The pipes 68 and 69 lead to the ahead fluid motor 52 and the astern fluid motor 53, respectively, of the actuator 50 associated with engine 1. It will thus be seen that with lever 132 of the maneuvering control device 114 in a vertical position fluid at substantially twenty pounds' pressure will be provided in both of the actuator motors 52 and 53 to hold the maneuvering lever 44 of engine 1 in its "Stop" position. Movement of lever 132 of the maneuvering control device 114 to "Shift" position at the "Ahead" side of its "Stop" position will cause operation of the valve device 152 to provide fluid at thirty-five pounds' pressure in the ahead motor 52 while providing for operation of valve device 151 to open pipe 69 and thereby the astern motor 53 to atmosphere, so that the ahead motor 52 will turn the maneuvering gear lever 44 to its "Shift" position at the "Ahead" side of "Stop" position. Movement of lever 132 to "Start" position at the "Ahead" side of "Stop" position will cause operation of the fluid motor 52 to move the maneuvering control lever 44 to its "Start" position at the "Ahead" side of "Stop" position. Movement of lever 132 back to "Run" position at the "Ahead" side of "Stop" position will then result in movement of the maneuvering gear control lever 44 back to its "Run" position at the "Ahead" side of "Stop" position under the pressure of spring 71 acting on piston 54 in the astern motor 53. Return of lever 132 to its "Stop" position, with a consequent reduction in pressure of fluid in the ahead motor 52 to a degree such as twenty pounds and a corresponding increase in pressure of fluid in the astern motor 53 will return the maneuvering gear lever 44 to its "Stop" position.

In a manner similar to that just described, the maneuvering gear lever 44 of engine 1 may be caused to selectively assume any one of its positions at the "Astern" side of "Stop" position upon movement of lever 132 to a corresponding position at the "Astern" side of its "Stop" position, as will be apparent.

The actuator 50 associated with engine 2 will operate to cause starting and reversing of said engine and shifting of the cams therein in response to operation of lever 132 of the maneuvering control valve device 115 in the same manner as just described in connection with the maneuvering control device 114 and actuator 50 associated with engine 1.

A cock 325 is provided in each of the pipes 68 and 69 leading to the two actuators 50. As shown in Fig. 14, this cock comprises a plug valve 326 having a passage 327 for normally establishing communication through the respective pipe. The plug valve 326 is rotatable by a handle 328 to another position for closing this communication and in which position one end of the passage will register with a passage 329 in the casing wall which passage 329 leads to atmosphere. The plug valve also has a passage 330 open at one end to passage 327 and arranged to register with the portion of the pipe leading to the actuator with passage 327 open to passage 329 for releasing actuating fluid from the actuator. Thus by operation of cocks 325 either actuator 50 may be either cut out and rendered non-responsive the respective maneuvering control device 114 or or cut in and rendered responsive to operation of 115.

Engine cam shifting and starting interlock

It is undesirable to permit movement of either maneuvering gear actuator lever 44 past either "Shift" position to the respective "Start" position until after the cams of the engine have been conditioned in the "Shift" position by the cam shifting motor 24 to provide for starting and operation of the engine in the selected direction. According to the invention, this is accomplished with respect to both engines by the provision of means for preventing movement of the maneuvering control levers 132 past either "Shift" position to "Start" position, until after the cam shifting motor 24 has operated to properly condition the cams in the respective engines.

This means for each of the maneuvering control devices 114 and 115 comprises a rockable member 205 mounted on a cap screw 206 secured to the bracket 126. A member 207 is secured to the end of shaft 128 above the member 205 by a cap screw 208 and is rotatable with said shaft. The member 207 has two shoulders 209 and 210 which are spaced apart and arranged for engagement by the ends of two arms 211 and 212 respectively, of member 205.

With the lever 132 of the maneuvering control device 114 in its "Stop" position and member 205 in the position shown in Fig. 5, the end of arm 211 is spaced from shoulder 209 a distance sufficient to allow movement of said lever out of "Stop" position in the "Ahead" direction to "Shift" position but to prevent further movement thereof until after the arm 211 is pulled out of the path of movement of shoulder 209, in a manner which will be later described. With the arm 211 out of the path of movement of shoulder 209, the arm 212 is disposed in the path of movement of shoulder 210, whereby movement of the lever 132 out of "Stop" position in the "Astern" direction is limited to "Shift" position by engagement between the shoulder 210 and the end of arm 212. Return of the member 205 to the position shown in the drawing will move the end of arm 212 out of the path of movement of shoulder 210 whereby the lever 132 may be moved further in the "Astern" direction.

The member 205 is provided with a third arm 213 the end of which is operatively connected to a double acting piston 214. This piston has at one side a pressure chamber 215 connected to a control pipe 216 and at the opposite side has a pressure chamber 217 connected to a control pipe 218. The piston is provided with two annular recesses 219 and 220. A spring pressed plunger 221 is arranged to enter recess 220 with the piston 214 in the position shown for holding same against undesired movement out of such position, while another spring pressed plunger 222 is arranged to enter recess 219 for holding the piston against unwanted movement out of a position to the left of that shown. With the piston 214 in the position shown in the drawing, which it will assume upon supply of fluid under pressure to chamber 217, the member 205 assumes the position shown in which arm 211 is turned into the path of movement of shoulder 209. In the other position of piston 214 defined by engagement of plunger 222 with recess 219 and which position will be assumed upon supply of fluid to pressure chamber 215, the member 205 will be rocked to the position in which arm 212 is disposed in the path of movement of shoulder 210.

The pipes 216 and 218 connected to the maneuvering control device 114 lead to the cam shifting motor 24 of engine 1, the pipe 216 being so connected to said motor as to be opened to chamber 28 above the ahead shifting ram 26 when said ram occupies its lower position, while the pipe 218 is arranged to be connected to chamber 27 above the astern shifting ram 25 when it is in its lower position, as shown in the drawing.

After lever 132 of the maneuvering control device 114 has been at the "Astern" side of "Stop" position, the member 205 will be in the position shown in Fig. 5. Now let it be assumed that it is desired to start engine 1 in the direction for causing ahead movement of the ship. To accomplish this, lever 132 in the maneuvering control device 114 is moved from "Stop" position in the "Ahead" direction and such movement is stopped in the "Shift" position due to engagement between shoulder 209 on member 207 and the end of arm 211 connected with the piston 214. However, in this "Shift" position of lever 132 the actuator 50 associated with engine 1 moves the maneuvering gear control lever 44 to its "Shift" position for operating the valve device 29 to supply fluid to chamber 28 above the ahead ram 26. This ram is then moved to its lowermost position for conditioning the valves in the engine to provide for starting and running of same in a direction to cause ahead movement of the ship. After the ram 26 attains its lowermost position, in which the cams of the engine are conditioned as desired, fluid then flows from pressure chamber 28 to pipe 216 and thence to chamber 215 at one side of the interlock piston 214. Chamber 217 at the opposite side of the piston is at this time open to atmosphere as will be later brought out, as a result of which the pressure of fluid in chamber 215 shifts the piston 214 to its left-hand position, thereby moving the end of arm 211 out of engagement with shoulder 209 on the member 207. Thus, after the cams in the engine have been properly conditioned, the operator may move lever 132 of control device 114 past "Shift" position at the "Ahead" side of "Stop" to the "Start" position, for starting the engine, and he may then move said lever back to "Run" position after the engine has started.

After the maneuvering control lever 44 associated with engine 1 is moved out of its "Shift" position as above described, fluid pressure is released from the ram chamber 28 past the valve stem 48 in the valve device 29 as before described whereby pipe 216 and pressure chamber 215 at one side of the interlock piston 214 are vented to the atmosphere to render said piston operable upon a subsequent supply of fluid under pressure to chamber 217.

Now let it be assumed that after engine 1 has been operating in response to lever 132 having been in "Run" position at the "Ahead" side of "Stop," it is desired to reverse the direction of operation of the engine. To accomplish this the lever 132 of the maneuvering control valve device 114 is moved to "Shift" position at the "Astern" side of "Stop" in which the end of arm 212 engages shoulder 210 on the member 207 so as to prevent further movement of said lever to its "Start" position. However, in this "Shift" position, the actuator 50 associated with engine 1 moves the maneuvering control lever 44 to its "Shift" position at the "Astern" side of "Stop" position for thereby actuating the valve device 29 to supply fluid to pressure chamber 27 above the astern ram 25. The ram 25 then moves to its cam shifting position shown in the drawing and in which fluid pressure then flows through pipe 218 to chamber 217 wherein it acts on piston 214 and moves same back to the position shown in the drawing. This movement of piston 214 draws arm 212 out of the path of movement of shoulder 210 whereby the operator may then move lever 132 to "Start" position at the "Astern" side of "Stop" and subsequently to the adjacent "Run" position. It will thus be seen that to reverse the direction of operation of engine 1, regardless of the direction in which it had previously been operated, the operator's lever 132 in control device 114 and the maneuvering lever 44, cannot be moved past their "Shift" positions to their "Start" positions until after the cams in the engine have been properly conditioned to provide for starting of the engine in the desired direction.

It should be noted, however, that if engine 1 had been operated to cause movement of the ship in an astern direction and then stopped, under which condition piston 214 will be in the position shown, movement of the operator's lever 132 in the control device 114 to restart the engine in the same direction will not be stopped in "Shift" position of said lever since the arm 212 is already out of the path of movement of shoulder 210, whereby the lever may be moved from "Stop" position directly to "Start" position at the "Astern" side of "Stop" position. The same thing is true in case the engine has been operating to propel the ship forwardly and subsequently stopped and the operator then desired to start the engine again in the same direction.

As above mentioned interlock means of the same type as above described are associated with engine 2 and with the manual control device 115 for preventing reversing of said engine until after the cams therein have been conditioned according to the desired direction of engine operation.

*Interlock to prevent starting of engines in opposite directions*

Since engines 1 and 2 are connected to drive the common propeller shaft 7, it is undesirable, while one of said engines is driving said shaft to be able to start the other engine to operate said shaft in the reverse direction. According to the invention, the levers 132 of the two control devices 114 and 115 are independently operative to start the engines for driving the propeller shaft 7 in the same direction or to stop the engines, but means are provided to prevent operation of said levers to start the two engines in reverse directions. This means will now be described.

The two maneuvering control devices 114 and 115 are spaced apart with the shafts 128 arranged in coaxial relation, and interposed between and in coaxial relation with said shafts is a third shaft 225 (Fig. 12) which is carried by the speed control device 117 in a manner which will be later described.

Two like but oppositely arranged interlock members 226 and 227 are keyed on the opposite ends of the shaft 225 and each comprises a disk sector 228. Like interlock members 229 and 230 are keyed on the adjacent ends of the two shafts 128 with the disk sectors 228 thereof disposed in the operating paths of those on shaft 225. By this arrangement it will be seen that either of the maneuvering control levers 132 is capable of limited movement relative to the other.

The combined length of the several disk sectors 228 is such as to prevent movement of either maneuvering lever 132 to "Start" position at either side of its "Stop" position, while the other maneuvering lever 132 is in "Run" position at the opposite side of its "Stop" position. The several sectors 228 cooperate to allow movement of both levers at will to their different positions at the same side of their stop positions, that is, either the "Astern" side or the "Ahead" side. Thus, the two engines may be individually started to drive the propeller shaft 7 in either and the same direction and individually stopped, but while either engine is operating to drive the propeller shaft the maneuvering control lever 132 for controlling the other engine cannot be operated to start such engine in a direction to turn the propeller shaft in the opposite direction.

The two pairs of interlocking disk sectors 228 are provided instead of only one pair in order to insure intended operation of the two maneuvering control devices 114 and 115 in case of slight misalignment of the two operating shafts 128.

*Control of brake on propeller shaft*

The cam 131 mounted on shaft 128 in the maneuvering control device 114 is provided for controlling the operation of a brake control device 233, while the corresponding cam in the maneuvering control device 115 is provided for controlling a brake control device 234.

Each of the devices 233 and 234 are of identical construction and, as shown in Fig. 8, comprises two axially aligned poppet valves 235 and 236 contained in chambers 237 and 238, respectively. The poppet valve 235 has a fluted stem extending through a suitable bore in a wall separating chambers 237 and 238 with the end of said stem engaging the poppet valve 236. The poppet valve 235 is provided for controlling communication between the two chambers 238 and 237, and a spring 239 in chamber 237 acts on said valve for urging same to its closed position.

The poppet valve 236 has a fluted stem 240 which is disposed to slide in a bore provided in a sleeve 241 which is slidably mounted in a member 242. Sleeve 241 has a chamber 243 open to the atmosphere through one or more ports 244 and into which valve stem 240 projects. Chamber 243 contains a spring 245 acting on the valve stem 240 for maintaining the valve 236 in engagement with the valve 235 so as to allow opening of communication past the valve 236 upon movement of sleeve 241 in a direction away from such valve.

The outer end of sleeve 241 is engaged by an adjustable screw 246 provided in one end of a lever 247 which near its center is fulcrumed on a pin 248 provided in a bracket 249a projecting from the casing. The opposite end of lever 247 engages the peripheral surface of cam 131. The cam 131 is provided with two notches 249 and 250 in its peripheral face for receiving the end of lever 247. With the end of the lever in either of these notches the supply valve 235 will be seated under the action of spring 239 while the sleeve 241 will be moved out of contact with the valve 236 by spring 245 so as to open chamber 238 to the atmosphere. When the end of lever 247 is in engagement with the surface of cam 131 at either side of either of the notches 249 and 250, the lever will be rocked from the position shown in the drawing in a clockwise direction and this rocking movement will move the sleeve 241 into seating engagement with the valve 236 and move said valve to a position for unseating the valve 235 in which position these parts are shown in Fig. 8. With the valve 236 closed communication is closed between chamber 238 and the atmosphere while said chamber is open to chamber 237 past the valve 235. The notch 249 is provided to receive the end of lever 247 when the maneuvering lever 132 is in "Run" position at the "Ahead" side of "Stop" position, while the notch 250 is provided to receive the end of said lever with the maneuvering control lever 132 in "Run" position at the opposite or "Astern" side of "Stop" position. Thus with the maneuvering lever in either "Run" position, the valve 235 will be closed and the valve 236 will be open, while with the lever out of either "Run" position the valve 235 will be open and the valve 236 closed.

Chamber 238 in the brake control device 233 associated with the maneuvering control device 114 is connected to pipe 20 leading to the brake control relay valve device 19, while chamber 237 is connected to a pipe 251 which leads to chamber 238 in the brake control device 234 in the maneuvering control device 115, and chamber 237 in the control device 234 is connected to the fluid pressure supply pipe 156. By this arrangement, when lever 132 in the maneuvering control valve device 114 is in either "Run" position pipe 20 will be open to the atmosphere so that the brake control relay valve device 19 will operate to release fluid from cylinder 18 to thereby release the brake on the propeller shaft 7. If lever 132 of the maneuvering control device 114 is in any position out of either "Run" position, the brake control pipe 20 will be connected through the brake control device 233 to the brake control device 234; and if lever 132 of the maneuvering control device 115 is in either "Run" position at this time, the brake control pipe 20 will therefore be open to atmosphere so that the brake on the propeller shaft 7 will be released. However, if neither of the maneuvering control levers 132 is in either one of their "Run" positions, fluid under pressure will be supplied to the brake control pipe 20 for thereby actuating the brake to brake the propeller shaft 7.

It will thus be seen that when the propeller is being driven by either or both engines the brake will be released from the shaft 7. The brake will be applied to the propeller shaft only when both engines are not driving same. The purpose of the brake is to stop the propeller upon stopping the engine or engines so as to make it possible to start the engine or engines in the reverse direction for reversing the direction of travel of the ship. Otherwise, torque of the propeller would act to keep the engine or engines operating in the direction of movement of the ship and oppose and possibly prevent starting in the reverse direction.

*Removal of either maneuvering control device 114 or 115 without loss of control of brake from other maneuvering control device*

If in service either one of the maneuvering control devices 114 or 115 should fail for any reason and it would be necessary to remove same from the base plate 111 for repair or replacement, it is desirable that the ship be capable of control by the other maneuvering control device and engine or engines connected thereto.

In case of removal of either maneuvering control device it is necessary to close the connection between the fluid pressure supply pipe 156 and said device, and due to the control of the brake being normally interlocked through the two brake control devices 233 and 234 associated with the two maneuvering control devices just described, it is also necessary in case of removal of either maneuvering control device to break such interlock and connect the brake for control by the remaining maneuvering control device. These features are obtained by an interlock arrangement such as shown in Figs. 16, 17 and 18.

According to this arrangement communication between the fluid pressure supply pipe 156 and the two maneuvering control devices 114 and 115, and between the brake control relay pipe 20 and the two brake control devices 233 and 234 is controlled by two manually operative cut out and transfer control valve devices 325a and 326a which, though not so shown, may be associated with the control stand 110.

The two valve devices 325a and 326a are of identical structure but are shown in the drawing in reversed relation. Each comprises a casing having a chamber 327a containing a rotary valve 328a having a normal operating position as shown in Fig. 16, and a cut out position as shown in Fig. 17 or Fig. 18. Each rotary valve is connected by a key 329a to an operating lever 330a for turning the valve to its different positions.

Opening to the seat of each rotary valve are seven passages 331 to 337, inclusive. The passage 331 in each rotary valve seat is connected to the fluid pressure supply pipe 156. Each rotary valve has a port 338 which registers with passage 331 in the normal position of the rotary valve and a passage 339 which registers with passage 331 in the cut out position, whereby each rotary valve chamber 327a is constantly supplied with fluid under pressure from pipe 156.

The passage 333 in the cut out valve device 325a is connected to a pipe 340 which constitutes the fluid pressure supply pipe to the maneuvering control device 114, while passage 333 in the cut out valve device 325a is connected to a corresponding pipe 340 which constitutes the fluid pressure supply pipe to the maneuvering control device 115 and to the brake control device 234. Each rotary valve 328a has a port 341 which connects the rotary valve chamber 327a to the respective passage 333 in the normal position of the rotary valve. In the cut out position of the rotary valve the passage 333 is lapped thereby. It will thus be seen that with the rotary valves 328a in the normal position fluid under pressure will be supplied to both maneuvering control devices 114 and 115 to provide for control of the actuators 50 and of the propeller brake in the same manner as above described. In the cut out position of the rotary valves as shown in Figs. 17 and 18 the supply of fluid under pressure to the maneuvering control devices will be cut off to permit removal of said devices without losing fluid under pressure.

Each rotary valve 328a has two cavities 342 and 343 for connecting passages 334 and 335, and 336 and 337, respectively, in the normal position of the rotary valve. Passage 335 in the cut out valve device 326a serves no useful purpose and is closed by a plug 344. Each rotary valve also has two passages 345 and 346 (Figs. 17 and 18) to function in the cut out position of the valve. The passage 345 is provided for connecting passages 332, 335 and 337, while passage 346 is provided for connecting passages 334 and 336.

Pipe 20 from the brake control relay valve device 19 is connected to passage 334 in the cut out valve device 325a. Pipe 251 is connected to passages 336 in the two cut out valve devices 325a and 326a. Chambers 237 and 238 in the brake control device 233 are connected by pipes 347 and 348 to passages 337 and 335, respectively, in the cut out valve device 325a, while chambers 237 and 238 in the brake control device 234 are connected by pipes 340 and 349, to passages 333 and 337, respectively, in the cut out valve device 326a.

With the rotary valves 328a of the two cut out valve devices in their normal position as shown in Fig. 16, pipe 20 from the brake control relay valve device will be connected through cavity 342 in rotary valve 328a of the cut out valve device 325a to pipe 348 and thence through the brake control device 233, pipe 347, cavity 343 in said rotary valve, pipe 251, cavity 343 in the rotary valve of the cut out valve device 326a and pipe 349 to chamber 238 in the brake control device 234, and since chamber 237 in the brake control device 234 is supplied with fluid under pressure from the supply pipe 156 at this time by way of pipe 349, the structure will operate in the same manner as hereinbefore described to cause the brake on the propeller shaft 7 to be released whenever lever 132 of either or both maneuvering control device 114 or 115 is in either "Run" position, and to be applied at all other times.

Now let it be assumed that it is desired to remove the maneuvering control device 114 from the stand 110 without interfering with the control of engine 2 or with the propeller brake from the maneuvering control device 115. The operator turns the cut out valve 325a from the normal position shown in Fig. 16 to the cut out position shown in Fig. 17. This closes communication between the fluid pressure supply pipe 156 and the maneuvering control device 114 as above described. Also in this position of the cut out valve device 325a, the brake control pipe 20 is disconnected from the brake control device 233 and connected by way of passage 346 in the rotary valve to pipe 251 and thence through the cut out valve device 326a to the brake control device 234 whereby the brake is arranged for control solely by the brake control device 234 associated with the maneuvering control device 115. With the parts thus conditioned, the brake will be applied whenever the lever 132 of the maneuvering control device 115 is out of its "Run" positions and released in said positions in the same manner as before described. Also, in the cut out position of the cut out valve device 325a pipes 348 and 347 and chambers 238 and 237 in the brake control device 233 are opened to atmosphere through passage 332 in said device for bleeding fluid under pressure therefrom prior to removing the maneuvering control device 114.

When the maneuvering control device 114 is replaced on the control stand 110, the cut out valve device 325a will be returned to the normal position shown in Fig. 16, and the system will then operate in the same manner as before described.

If it is desired to remove the maneuvering control device 115 from the control stand and retain control of engine 1 and of the propeller brake by the maneuvering control device 114, the cut out valve device 326a is turned to its cut out position shown in Fig. 18. In this position communication is closed between the fluid pressure supply pipe 156 and pipe 340 leading to the maneuvering control device 115 and brake control device 234, chamber 238 in the brake control device 234 is opened to atmosphere by way of passage 332 in the cut out device, and pipe 251 is connected through passage 346 in the rotary valve of the cut out valve device 326a to passage 334 therein which is connected to the fluid pressure supply pipe 156. Fluid under pressure is thus supplied through the cut out valve device 326a in cut out position and the cut out valve device 325a in normal position to pipe 347 whereby the brake control device 233 will cause the brake on the propeller shaft to be released when lever 132 of the maneuvering control device 114 is in either "Run" position and applied in all other positions, as desired.

Upon replacement of the maneuvering control device 115 on stand 110, the cut out valve device 326a will be turned back to its normal position in which the system will again function in the manner before described.

It will be seen that the two cut out valve devices 325a and 326 cooperate when in their normal positions to interlock the control of the propeller brake through the two brake control devices 233 and 234. Turning the cut out valve device 325a to its cut out position provides for control of the brake solely by the brake control device 234, while turning cut out valve device 326a to its cut out position provides for control of the brake solely by the brake control device 233, whereby either maneuvering control device may be removed from stand 110 without changing the control of the brake from the other maneuvering control device.

Control of engine speed

Pipe 84 connected to the speed regulating device 80 associated with engine 1 is connected through the selector valve 120 to a speed control pipe 255, while the speed regulating device 81 associated with engine 2 is connected to pipe 255 through the selector device 121.

These two selector valve devices 120 and 121 are of identical structure and each may comprise, as shown in Figs. 3 and 13, a plug valve 256 and a key 257 for turning said valve to two different positions. The plug valve, in the position in which it is shown in Fig. 3, establishes communication by way of a passage 258 therein between the two pipes connected to the selector valve device. In the other position of the plug valve 256 this communication is closed and a port 258a in the plug valve is brought into registry with the pipe leading to the respective speed regulating device 80 or 81, while passage 258 registers with a passage 259 leading to the atmosphere, for thereby releasing actuating fluid from the respective speed regulating device 80 or 81.

The speed control pipe 255 leads to the speed control device 117 in the control stand 110. The speed control device 117 comprises a base member 260 forming part of a self-lapping valve device 261 which may be of identical structure to the self-lapping valve devices 151 and 152 above described and which is provided for controlling or regulating the pressure of fluid in the speed control pipe 255 from atmospheric pressure to any degree in excess of atmospheric pressure. Fluid for supply to the speed control pipe 255 by operation of the self-lapping valve device 261 is provided to said device through a branch from the fluid pressure supply pipe 156.

The base member 260 has two upstanding brackets 262, the ends of which are provided with bores aligned with shafts 128 and journaled in these bores are the opposite ends of a sleeve 263 (Fig. 12). One end of this sleeve is provided with an annular collar 264 engaging the outer face of the respective bracket 262, while a nut 265 is provided on the opposite end of the sleeve for engaging the opposite side of the other bracket 262, thereby securing the sleeve against longitudinal movement.

Sleeve 263 has interiorly at its opposite ends two bearings 266 and the interlock shaft 225 hereinbefore described extends through the sleeve and is supported in these bearings for rocking movement relative to the sleeve.

An operating lever 267 extending through a slot 112a in the cover 112 has one end keyed to the sleeve 263 (Fig. 10) between the two brackets 262. Below the sleeve the lever is provided with a cam 268 which engages one end of an arm 269 providing an operating connection between said cam and the regulating screw 188 of the self-lapping valve device 261. The other end of arm 269 is pivoted on a pin 270 carried by a bracket 271 projecting from the base member.

The cam 268 is so designed as to permit movement of the regulating screw 188 to its uppermost control position for opening the speed control pipe 255 to atmosphere when the lever is at the end of slot 112a adjacent the operator's holding bar 113. Movement of the lever 267 from this position in the direction of the opposite end of the slot 112a will turn the cam 268 relative to the regulating screw 188, and the cam is so designed as to effect displacement of said screw in a downward direction a distance proportional to the extent of movement of the lever from the position adjacent the operator's holding bar 113. Thus, while the lever 267 is in the position adjacent the holding bar 113, the speed control pipe 255 will be opened to the atmosphere, and fluid will be supplied to said pipe upon movement of, said lever away from this position at a pressure proportional to the extent of such movement. The pressure supplied to pipe 255 will flow simultaneously to both of the speed regulating devices 80 and 81, assuming the two selector devices 121 and 120 to be in their open positions as shown in Fig. 3, whereby like and simultaneous adjustment of speed of both engines will be obtained. If it is desired to stop either engine or to hold its speed down to idling while causing operation of the other engine at a greater speed, the respective selector valve 120 or 121 may be turned to the position for closing communication between the speed control pipe 255 and pipe 84 or 104 and for opening the pipe 84 or 104 to atmosphere. Thus either engine may be rendered responsive to operation of the speed control lever 267, or either engine may be rendered non-responsive, or if desired both engines may be caused to respond in unison to such operation.

The speed control lever 267 comprises an inner member 273 which is secured to the sleeve 263 and on which is provided cam 268, and a pin 274 projecting from said member through the slot 112a. A brake member 275 is slidably mounted on the pin 274 adjacent the inner member 273 and a hand grip 276 is mounted on pin 274 beyond the brake member 275. The grip 276 has screw-threaded engagement with pin 274 whereby upon turning the grip in one direction it will move inwardly of the pin 274 while upon turning in the opposite direction it will move outwardly. A spring 277 encircling the pin 274 within a cavity provided in the inner end of the hand grip 276 bears against the member 275 urging same in the direction of the inner member 273.

One of the brackets 262 projecting from base portion 260 of the speed control device is provided above sleeve 263 with an arcuate V-shaped rail 278 (Figs. 1 and 12), and the member 275 mounted on the pin 274 is provided at one side with an outstanding portion having, as shown in Fig. 1, an inverted V-shaped recess to receive the rail 278. The spring 277 constantly maintains the member 275 in contact with rail 278. With the hand grip 276 turned to a position for removing pressure thereof against member 275 the pressure between the member 275 and rail 278 is reduced to only that provided by spring 277 whereby the lever 267 is freely movable in the slot 112a. Rotation of the grip 276 on pin 274 in a direction for moving the grip toward member 275 will urge said member into gripping engagement with the rail 278 for holding the lever 267 in an adjusted position. Thus the operator may move the lever 267 to any desired position for obtaining a selected speed or power output of either or both engines and then the grip 276 may be turned to force the member 275 into locking engagement with rail 278 to thereby hold said lever in the selected position. Turning of the lever grip 276 in the reverse direction will release the lever for movement.

The vernier control valve device 122 comprises a self-lapping valve device 279 having a regulating screw 188 and which otherwise may be identical to the self-lapping control devices 151, 152, and 261 hereinbefore described. The regulating screw 188 is disposed within a sleeve 280 having internal screw-threads for engagement with threads provided in a hollow stud 281 which is arranged to be turned by a hand wheel 282, said stud engaging the regulating screw 188. The self-lapping control device 279 is connected to pipe 97 leading to the vernier diaphragm chamber 96 in the speed regulating device 80 and receives fluid for supply to said pipe from the fluid pressure supply pipe 156. The hand wheel 282 is initially adjusted to cause operation of the self-lapping valve device 279 to provide fluid in pipe 97 and thereby in the speed regulating device 80 at some degree such as twenty-five pounds as before mentioned. Turning of the hand wheel 282 in one direction will cause operation of the self-lapping valve device 279 to reduce the pressure of fluid supplied to pipe 97, while turning in the opposite direction will cause said valve device to operate to increase the pressure of fluid supplied to said pipe. By properly adjusting the hand wheel 282, it will, therefore, be evident that the speed of engine 1 may be adjusted relative to that of engine 2 in order to bring the speed or power output of the two engines into synchronism.

*Clutch control devices 118 and 119*

The clutch control devices 118 and 119 are identical in construction and operation to control the clutch cylinders 12 of the respective engines 1 and 2, and only the device 118 will therefore be described in detail.

As shown in Fig. 4, the clutch control device 118 comprises an operating shaft 285 and at one side thereof a supply and release valve device 286 and at the opposite side a supply and release valve device 287a which is identical but arranged opposite to the valve device 286.

The valve device 286 comprises two axially aligned poppet valves 287 and 288 contained in chambers 289 and 290 respectively. The chamber 289 is constantly supplied with fluid under pressure from pipe 156 by way of a passage 291, Chamber 290 is connected to a pipe 292 which leads to the right-hand end of cylinder 12 associated with the clutch 3.

The poppet valve 287 has a fluted stem extending through a bore in a wall separating chambers 289 and 290 and in chamber 290 contacts the valve 288. The valve 288 has a fluted stem 293 slidably mounted in a bore in a sleeve 294 which is slidably mounted in a member 295 secured to the casing. The sleeve 294 has a chamber 296 in constant communication with the atmosphere through one or more ports 297 and contains a spring 298 acting on stem 293 of valve 288 for holding said valve against movement upon movement of sleeve 294 in a direction away from said valve for thereby opening communication between chamber 290 and the atmosphere.

The valve device 287a comprises a valve 300 contained in a chamber 301 which is open to the fluid pressure supply passage 291. The valve 300 has a fluted stem extending through a bore separating chamber 301 from a chamber 303 which is connected by a pipe 302 to the left-hand end of cylinder 12 associated with clutch 3. A poppet valve 304 contained in chamber 303 is engaged by the end of the stem projecting from valve 300 and has a fluted stem 305 projecting into a bore 306 provided in a sleeve 307 which is mounted to slide in a member 308 secured in the casing. A spring 309 in chamber 306 bears against the valve stem 305 for holding valve 304 against movement upon movement of sleeve 307 in the direction away from said valve to thereby open chamber 303 to the atmosphere by way of chamber 306 and one or more ports 310.

A cam 311 is mounted on the shaft 285 between the two sleeves 294 and 307. A lever 312 is also mounted on shaft 285 and connected to cam 311 for turning same. The lever 312 extends through a slot 313 in the cover 112 and may be like either of the levers 132 and therefore provided with a latch 314 movable inwardly of the cover by the application of manual pressure to a plunger 315 projecting from the end of the lever and movable outwardly of the cover upon the release of manual pressure on said plunger. The cover is provided with two notches 316 and 317 open to one side of slot 313 to receive the latch 314 in two different operating positions of the lever 312 for holding said lever against movement, said lever being movable from either of said positions to the other upon movement of the latch 314 out of the respective notch.

The cam 311 is provided with a surface 318 which when in engagement with sleeves 294 or 307 will effect closure of valve 288 or 304 and opening of valve 287 or 300. The cam also has another surface 319 formed at a smaller radius than surface 318 to allow closing of valve 287 or 300 and opening of valve 288 or 304 upon contact with said surface of sleeves 294 or 307, respectively. These surfaces are so arranged that in the position of lever 312 shown in Figs. 1, 2 and 4, and which may be called the dump position, the valve 300 will be closed and the valve 304 opened for thereby venting fluid under pressure from chamber 13 at the left-hand side of piston 11 in the cylinder 12 associated with the clutch 3. Also in this position of lever 312 the valve 288 is closed and the valve 287 opened so that fluid under pressure may flow through pipe 292 to the opposite side of piston 11 in cylinder 12 for thereby moving the clutch arm 8 to its clutch dump position, as shown in the drawing to disconnect the engine 1 from the drive shaft 5.

Movement of the clutch control lever 312 from the position shown in Fig. 4 to its other or fill position, indicated by the dot and dash line 320 and in which the latch 314 is aligned to enter the notch 317, will effect operation of the valve device 286 to open pipe 292 and thereby chamber 14 in the cylinder 12 associated with clutch 3 to the atmosphere, while the valve device 287a will be conditioned to supply fluid to pipe 302 and thus to chamber 13 in said cylinder. The piston 11 will then operate to turn the clutch control lever 8 from the position shown in Figs. 1 and 15 to that indicated by the dot and dash line 9 for supplying liquid to the clutch 3 to connect engine 1 to the drive shaft 5.

The clutch control device 119, which is identical to the clutch control device 118 just described, is operative in the same manner to control the operation of cylinder 12 associated with clutch 4 to either connect or disconnect engine 2 to or from the drive shaft 5.

*Summary*

From the above description it will now be seen that I have provided a propulsion system embodying a plurality of reversible Diesel engines and means for selectively controlling the individual starting of said engines in either direction, the reversing of said engines, and the stopping of same. The engines are of the type embodying cam shafts which are shiftable to different positions according to the desired direction of operation of the engines, and means are provided for preventing starting of the engines until after the cam shafts in the engines have been shifted into the selected position. In the structure used for illustration the two engines are connected to drive a common member, and interlock means are associated with the individual starting and reversing control means for preventing starting of either engine in one direction while the other engine is operating to drive the drive shaft in the opposite direction. The individual starting and reversing control for the two engines is arranged in a control stand which also embodies means for controlling the speed of the engines either individually or in unison. Vernier control means are also associated with the control stand for controlling the speed or output of one engine relative to the other to thereby bring the operation of one engine into synchronism with that of the other, if such is desired. A brake is associated with the member to be driven by the two engines for holding said member against turning while the engines are not operating to drive said member, but which automatically releases said member for turning upon connecting either engine to drive same. The system also embodies a clutch for connecting each engine to the drive shaft and an individual control device for each clutch is provided at the control stand for rendering the clutch either effective or ineffective.

Having described the invention what is claimed as new and desired to be secured by Letters Patent, is:

1. An apparatus for controlling the starting and running in either direction of two reversible prime movers comprising in combination, a manually movable lever for controlling each prime mover having a forward start position, a reverse start position and a neutral or stop position, means controlled by each of said levers operable upon movement thereof to its forward start position to effect starting of the respective prime mover in one direction and operable upon movement to its reverse start position to effect starting of the respective prime mover in the reverse direction and operable upon movement to its stop position to effect stopping of the respective prime mover, a shaft secured for rotation with each of said levers, the two shafts being disposed in coaxial relation, and means arranged to connect the two shafts including a plurality of disk sectors arranged for interengagement and of such circumferential length as to allow relative movement between the two levers in opposite directions a distance equal at least to that between either start position and stop position of either lever but less than the distance between the two start positions of either lever and also providing for relative movement of both levers in the same direction to corresponding positions.

2. A control apparatus for controlling the starting of a reversible prime mover having control means operable to condition said prime mover for operation in either one direction or in the reverse direction, actuating means for controlling said control means and for also controlling the starting and stopping of said prime mover and having one position providing for stopping of said prime mover, a second position to effect operation of said control means and a third position to effect starting of said prime mover, fluid controlled means operable by fluid pressure to move said actuating means from said second position to said third position, and means operative to provide such fluid pressure on said fluid controlled means subsequent to operation of said control means.

3. A control apparatus for controlling the starting of a reversible prime mover having control means operable to condition said prime mover for operation in either one direction or in the reverse direction, actuating means for controlling said control means and for also controlling the starting and stopping of said prime mover and having one position providing for stopping of said prime mover, a second position to effect operation of said control means and a third position to effect starting of said prime mover, fluid controlled means operable by fluid under pressure to move said actuating means from said second position to said third position, and means controlled by said control means and operable after operation thereof to condition said prime mover for operation, to provide said fluid pressure on said fluid pressure controlled means.

4. A control apparatus for controlling the starting of a reversible prime mover having control means operable to condition said prime mover for operation in either one direction or in the reverse direction, actuating means for controlling said control means and for also controlling the starting and stopping of said prime mover and having one position providing for stopping of said prime mover, a second position to effect operation of said control means and a third position to effect starting of said prime mover, said actuating means comprising a fluid pressure controlled abutment for moving said actuating means to said one position when subject to fluid at a certain pressure, to said second position when subject to fluid at a certain greater pressure, and to said third position when subject to fluid at a still greater pressure, means operable to provide said different pressures of fluid on said abutment, and means conditionable in accordance with the condition of said control means and operable to prevent obtaining said still greater pressure on said abutment until after operation of said control means to condition said prime mover for operation.

5. A control apparatus for controlling the starting of a reversible prime mover embodying control means operable by fluid under pressure to a chosen position for conditioning said prime mover for operation in a chosen direction, an actuator operable by fluid at a certain pressure to effect a supply of fluid to actuate said control means and operable by fluid at a higher pressure to effect starting of said prime mover, a control valve device operable to provide said different pressures of fluid on said actuator, and means controlled by said control means for controlling operation of said control valve device and operable prior to operation of said control means to limit operation of said control valve device to supply fluid at a pressure not exceeding said certain pressure and operative subsequent to operation of said control means to render said control valve device operable to supply fluid at said higher pressure.

6. A control apparatus for controlling the starting of a reversible prime mover which has a control means adjustable by fluid under pressure to condition said prime mover for operation in a chosen direction, said apparatus comprising in combination with said control means, an actuator operable by fluid at a certain pressure to a first position to effect a supply of fluid under pressure to said control means to adjust same and operable by fluid at a higher pressure to a starting position to effect starting of said prime mover, a self-lapping valve device comprising valve means operable to supply fluid under pressure to said actuator to operate same, a lever for actuating said valve device having one position providing for operation of said valve device to supply fluid at said certain pressure to said actuator and a second position to provide fluid at said higher pressure to said actuator, holding means operable to secure said lever against movement past its said one position to its said second position and releasable from said lever to allow such movement, and means for controlling said holding means controlled by said control means and being operative to release said holding means upon adjustment of said control means to condition the prime mover for operation.

7. A control apparatus for controlling the starting of a reversible prime mover which has a control means adjustable by fluid under pressure to condition said prime mover for operation in a chosen direction, said apparatus comprising in combination with said control means, an actuator operable by fluid at a certain pressure to a first position to effect a supply of fluid under pressure to said control means to adjust same and operable by fluid at a higher pressure to a starting position to effect starting of said prime mover, a self-lapping valve device comprising valve means operable to supply fluid under pressure to said actuator to operate same, a lever for actuating said valve device having one position providing for operation of said valve device to supply fluid at said certain pressure to said actuator and a second position to provide fluid at said higher pressure to said actuator, a latch for securing said lever against movement from said first position to said second position and releasable to allow such movement, a piston operable by fluid under pressure to release said latch, said control means being operative upon adjustment to condition said prime mover for operation in the chosen direction to supply fluid under pressure to actuate said piston, and means for releasing fluid pressure from said piston at all other times.

8. An apparatus for controlling stopping, and the starting and running of two reversible prime movers in either direction and for also controlling a braking means for braking a shaft arranged to be driven by said prime movers, said apparatus comprising a source of fluid pressure, motor means for each prime mover adjustable by fluid under pressure to a stop position to stop the prime mover, to a start position to start the prime mover in one direction and to a run position to provide for running of said prime mover in said one direction after starting, and being also adjustable by fluid under pressure to another start position and another run position to effect starting and running of said prime mover in the reverse direction, individual control means for each motor means comprising a manually operable lever having positions corresponding to the positions of the respective motor means and operable upon movement of said lever to each of such positions to provide fluid under pressure in the respective motor means to effect corresponding positioning thereof, brake control means operable by fluid under pressure to actuate said braking means to brake said shaft and upon release of fluid under pressure to effect operation of said braking means to free said shaft for movement, interlock valve means associated with each control means, and a cut out valve for each control means having a cut in position and a cut out position, the two interlock valve means cooperating with each other, with both cut out valves in their cut in position, to release fluid under pressure from said brake control means with either of said levers in either of its run positions, and to supply fluid under pressure to said brake control means with both of said levers out of either of their run positions, and each cut out valve being operative in the cut out position to render the respective interlock valve means non-operable to control the pressure of fluid in said brake control means and to render the other interlock valve means effective in the run positions of the respective lever to release fluid under pressure from said brake control means and in all other positions of the lever operable to supply fluid under pressure to said brake control means, each of said cut out valves also controlling flow of fluid from said source to the respective control means and providing for such flow in the cut in positions and preventing such flow in the cut out position.

9. An apparatus for controlling the stopping, starting and running of a prime mover comprising actuating means having a stop position for stopping said prime mover and a position providing for running of said prime mover after starting, manually controlled means for controlling the positioning of said actuating means comprising a manually movable lever having stop, start and run positions corresponding to the positions of said actuating means and being operable upon movement to either one of its different positions to effect corresponding positioning of said actuating means, and means operable upon release of manual pressure on said lever in its start position to effect movement thereof to its run position.

10. An apparatus for controlling the stopping, starting and running of a prime mover comprising actuating means having a stop position for stopping said prime mover, a start position to effect starting of said prime mover, and a run position providing for running of said prime mover after starting, means for controlling the position of said actuating means comprising a manually operable lever having a stop position, a start position and a run position and being operable upon movement to any one of said positions to effect corresponding positioning of said actuating means, manually releasable means operable to secure said lever in said stop position and run position, and means operable automatically upon release of manual pressure on said lever in said start position to move said lever to said run position.

11. An apparatus for controlling the starting, running and stopping of a pair of reversible prime movers, and for also controlling the speed or power output of said prime movers comprising in combination, an actuator for each prime mover having a stop position for stopping same, a start position at one side of stop position for starting said prime mover to operate in one direction, a run position adjacent said start position providing for running of said prime mover after starting, said actuator having at the opposite side of stop position another start position for starting said prime mover to operate in the reverse direction and an adjacent run position providing for running of said prime mover after starting in said reverse direction, an individual manually operative control device for controlling each of the actuators comprising a lever having a stop position and at one side thereof a start position and a run position and at its opposite side another start position and another run position and being operable upon movement of said lever to any one of its different positions to effect corresponding positioning of the respective actuating means, a manually adjustable speed control device interposed between the two manual control devices adjustable for varying the speed or power output of both of the prime movers, and means carried by said speed control device and cooperative with the two levers of said two manually operative control devices to provide for independent movement of both of said levers to their stop positions or to their start and run positions at the same side of their stop positions but arranged to prevent movement of either lever to its start position at one side of its stop position with the other lever in its run position at the opposite side of its stop position.

12. An apparatus for controlling the operation of a plurality of reversible engines for driving a common member comprising a plurality of fluid pressure controlled devices, one for controlling the starting, reversing, and stopping of each engine, braking means for said member rendered effective by fluid under pressure and ineffective upon release of fluid under pressure, a control stand, control pipes connecting said fluid pressure controlled devices and said braking means to said stand, said stand comprising valve means for controlling through certain of said pipes said fluid pressure controlled devices, lever means for actuating said valve means to effect operation of said fluid pressure controlled devices to stop said engines and to start said engines in either one direction or in the opposite direction and said lever means having a running condition to effect operation of said fluid pressure controlled devices to provide for running of said engines after being started, said control stand further comprising brake control valve means operable to control through another of said pipes supply and release of fluid under pressure to and from said braking means, means operable by said lever means to effect operation of said brake control valve means to supply fluid under pressure to said braking means at all times except with said lever means in said running condition, and means operable with said lever means in said running condition to effect operation of said brake control valve means to release fluid under pressure from said braking means.

13. Control apparatus for a multi-engine propulsion system for a shaft comprising for each engine fluid pressure controlled starting, stopping, and reversing means, and fluid pressure controlled speed regulating means, and further comprising braking means for said shaft rendered effective by fluid under pressure and ineffective upon release of fluid under pressure, and fluid pressure controlled clutch means for each engine, a control stand, and control pipes connecting the above named several means to said stand, said stand comprising valve means for controlling through certain of said pipes the fluid pressure for controlling said starting, stopping, and reversing means for the several engines, and manually operable lever means for actuating said valve means said lever means having forward and reverse running positions for, respectively, forward and reverse running of said engines, valve means operable by said lever means when out of said running positions to supply fluid under pressure to said braking means, and means operable in said running position of said lever means to release fluid under pressure from said braking means, means cooperative with said lever means operative to prevent operation thereof to effect operation of one of said starting means to start the respective engine in a direction the reverse of operation of the other engine, said control stand further comprising manually operable speed control valve means for controlling through the respective pipes operation of said speed regulating means, means associated with said stand operative to render said speed regulating means for either engine either responsive or non-responsive to operation of the last named valve means, and said stand still further comprising manually adjustable control valve means for controlling through the respective pipes the fluid pressure for controlling each of said clutch means.

14. An apparatus for controlling the starting, running, and stopping of a reversible prime mover and for also controlling braking means arranged to brake said prime mover comprising in combination, actuating means having a stop position providing for stopping of said prime mover, ahead and astern start positions providing for starting of said prime mover in either one direction or in the opposite direction, and ahead and astern run positions providing for running of said prime mover after being started in, respectively, said one and opposite directions, control means for controlling said acutating means and embodying a manually operable lever having a stop position, start positions, and run positions corresponding to those of said actuating means and operable upon movement to each of said positions to effect corresponding positioning of said actuating means, means operable by said lever in the start and stop positions thereof to effect operation of said braking means to brake said prime mover, and means operable in the run positions of said lever to render said braking means ineffective.

15. An apparatus for controlling the starting, running, and stopping of a reversible prime mover and for also controlling braking means arranged to brake said prime mover comprising in combination, actuating means having a stop position providing for stopping of said prime mover, ahead and astern start positions providing for starting of said prime mover in either one direction or in the opposite direction, and ahead and astern run position providing for running of said prime mover after being started in, respectively, said one and opposite directions, control means for controlling said actuating means and embodying a manually operable lever having a stop position, start positions, and run positions corresponding to those of said actuating means and operable upon movement to each of said positions to effect corresponding positioning of said actuating means, brake control means operable by fluid under pressure to render said braking means effective and upon release of fluid under pressure to render said braking means ineffective, valve means operable by said lever in the stop and start positions thereof to effect a supply of fluid under pressure to actuate said brake control means, and means operable in the run positions of said lever to effect operation of said valve means to release fluid under pressure from said brake control means.

16. An apparatus for controlling the individual starting, running, and stopping of two reversible prime movers connected to drive a common shaft and for also controlling a braking means arranged to brake said shaft comprising in combination, actuating means for each prime mover having a stop position providing for stopping of said prime mover, ahead and astern start positions providing for starting of said prime mover in either one direction or in the opposite direction, and ahead and astern run positions providing for running of said prime mover after being started in, respectively, said one and opposite directions, individual control means for controlling each of said actuating means, each of said individual control means comprising a manually operable lever having a stop position, start positions, and run positions corresponding to those of said actuating means and being operable upon movement of said lever to each of said positions to effect corresponding positioning of the respective actuating means, brake control means associated with each of said individual control means, the two brake control means being cooperable for controlling said braking means, means operable with either of said levers in either of its run positions to effect operation of the respective brake control means to render said braking means ineffective, and means operable by said levers when both are in any of their positions out of their run positions to effect operation of said brake control means to render said braking means effective.

17. An apparatus for controlling the individual starting, running, and stopping of two reversible prime movers connected to drive a common shaft and for also controlling a braking means arranged to brake said shaft comprising in combination, actuating means for each prime mover having a stop position providing for stopping of said prime mover, ahead and astern start positions providing for starting of said prime mover in either one direction or in the opposite direction, and ahead and astern run positions providing for running of said prime mover after being started in, respectively, either said one or opposite direction, individual control means for controlling each of said actuating means, each of said individual control means comprising a manually operable lever having a stop position, start positions, and run positions corresponding to those of said actuating means and being operable upon movement of said lever to each of said positions to effect corresponding positioning of the respective actuating means, brake control means operable by fluid under pressure to render said braking means effective and upon release of fluid under pressure ineffective, valve means associated with each of said individual control means individually operable to release fluid under pressure from said brake control means and cooperative with each other to supply fluid under pressure to said brake control means, means operable with either of said levers in either of its run positions to effect operation of the respective valve means to release fluid under pressure from said brake control means, and means operable by said levers with both of said levers in any position out of their run positions to effect operation of the respective valve means to supply fluid under pressure to said brake control means.

18. An apparatus for controlling the starting, running, and stopping of a reversible prime mover embodying control means adjustable to condition said prime mover for operation in either one direction or in the opposite direction, said apparatus comprising in combination, braking means for braking said prime mover, an actuating member having a stop position for stopping said prime mover, ahead and astern shift positions to effect adjustment of said control means to condition said prime mover for operation in, respectively, either said one or opposite directions, ahead and astern start positions to start said prime mover in, respectively, said one and opposite directions, and ahead and astern run positions providing for running of said prime mover after starting, control means for said actuating member comprising a lever having stop, shift, start and run positions corresponding to those of said actuating member and operable upon movement to each of said positions to effect corresponding positioning of said actuating member, means operable in either run position of said lever to render said braking means ineffective, and means operable by said lever in the stop, shift, and start positions thereof to render said braking means effective.

19. An apparatus for controlling the starting, running and stopping of a pair of reversible prime movers connected to drive a common element and each prime mover embodying control means adajustable to condition the prime mover for operation in either one direction or in the opposite direction, said apparatus comprising in combination, a braking means for braking said element, an actuating member for each prime mover having a stop position for stopping same, ahead and astern shift positions to effect adjustment of the respective control means to condition said prime mover for operation in, respectively, said one and opposite directions, ahead and astern start positions for starting the prime mover in, respectively, said one and opposite directions, and ahead and astern run positions providing for running of the prime mover after starting, individual control means for each actuating member comprising a lever having a stop position, shift positions, start positions and run positions corresponding to those of said actuating member and operable upon movement of said lever to each of said positions to effect corresponding positioning of the respective actuating member, brake control means associated with each lever for controlling said braking means and operable with either of the levers in a run position to effect operation of said braking means to release said element for movement, and means operable by said levers when both are in any position out of their run positions to effect operation of said brake control means to render said braking means effective to brake said member.

20. An apparatus for controlling the stopping, and the starting and running of two reversible prime movers in either direction and for also controlling a braking means for braking a shaft arranged to be driven by said prime movers, said apparatus comprising in combination, motor means for each prime mover having a stop position for stopping same, a start position to effect starting of the prime mover in one direction, a run position providing for running of said prime mover in said one direction after starting, and also having another start position and run position for starting and running of said prime mover in the reverse direction, control means for controlling said motor means comprising manually movable lever means having positions corresponding to the positions of said motor means and operable upon movement of said lever means to its different positions to effect like positioning of said motor means, brake control means for controlling said braking means, means operable in the run positions of said lever means to effect operation of said brake control means to render said braking means ineffective, and means operable by said lever means in all positions of said lever means except said run positions to effect operation of said brake control means to render said braking means effective.

21. An apparatus for controlling the stopping, and the starting and running of two reversible prime movers in either direction and for also controlling a braking means for braking a shaft arranged to be driven by said prime movers, said apparatus comprising in combination, motor means for each prime mover having a stop position for stopping same, a start position to effect starting of the prime mover in one direction, a run position providing for running of said prime mover in said one direction after starting, and also having another start position and run position for starting and running of said prime mover in the reverse direction, control means for controlling said motor means comprising lever means having positions corresponding to the positions of said motor means and operable upon movement of said lever means to its different positions to effect like positioning of said motor means, brake control means controlled by said lever means for controlling said braking means, means operable in the run positions of said lever means to effect operation of said brake control means to render said braking means ineffective, means operable by said lever means in all other positions of said lever means to effect operation of said brake control means to render said braking means effective, and means selectively operative to render either motor means responsive or non-responsive to operation of said control means.

22. An apparatus for controlling the starting, stopping and running of a reversible prime mover connected through a slip coupling to drive a shaft and for also controlling a braking means for braking said shaft, comprising in combination, motor means for said prime mover having ahead and astern start positions to effect starting of the prime mover in either one direction or in the opposite direction, and also having ahead and astern run positions for running of said prime mover after starting in either of said one or opposite directions, operator's control means for controlling said motor means comprising lever means having positions corresponding to those of said motor means and operable upon movement of said lever means to each of its different positions to effect corresponding positioning of said motor means, brake control means for controlling said braking means, means operable by said lever means in the start positions thereof to effect operation of said brake control means to render said braking means effective, and means operable with said lever means in the run positions thereof to effect operation of said brake control means to render said braking means ineffective.

23. An apparatus for controlling the stopping, and the starting and running of two reversible prime movers in either direction and for also controlling a braking means for braking a shaft arranged to be driven by said prime movers, said apparatus comprising in combination, motor means for each prime mover having a stop position for stopping same, a start position to effect starting of the prime mover in one direction, a run position providing for running of said prime mover in said one direction after starting, and also having another start position and run position for starting and running of said prime mover in the reverse direction, individual control means for each motor means comprising a manually movable lever having positions corresponding to the positions of said motor means and being operable upon movement of said lever to its different positions to effect like positioning of the respective motor means, an interlock means controlled by each lever operable to effect operation of said braking means to free said shaft for movement with the respective lever in either one of its run positions, each interlock means comprising means cooperative with the corresponding means in the other interlock means in a chosen position of said interlock means to effect operation of said braking means to brake said shaft, means operable by said levers in said start and stop positions to effect movement of the respective interlock means to the said chosen position, and cut-out means for each individual control means and the respective interlock means, each cut-out means having a normal position and a cut-out position for, respectively, rendering the respective individual control means and interlock means either effective or ineffective to control the respective motor means and said braking means, and each cut-out means further comprising structure effective in the cut-out position thereof to render said braking means controllable solely by the interlock means associated with the other individual control means.

ROY R. STEVENS.
ARTHUR G. LARSON.

REFERENCES CITED

The following references are of record in the file of this patent:

UNITED STATES PATENTS

| Number | Name | Date |
|---|---|---|
| 1,682,358 | Sperry | Aug. 28, 1928 |
| 2,003,351 | Ells | June 4, 1935 |
| 2,103,274 | Sanford | Dec. 28, 1937 |
| 2,243,883 | Ramstad | June 3, 1941 |
| 2,288,173 | Wohanka | June 30, 1942 |
| 2,289,654 | Keel | July 14, 1942 |
| 2,383,277 | Stevens | Aug. 21, 1945 |